United States Patent
Lee et al.

(10) Patent No.: US 12,082,163 B2
(45) Date of Patent: Sep. 3, 2024

(54) METHOD AND DEVICE FOR ALLOCATING RESOURCES IN NR V2X

(71) Applicant: LG Electronics Inc., Seoul (KR)

(72) Inventors: Jongyoul Lee, Seoul (KR); Hanbyul Seo, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 630 days.

(21) Appl. No.: 17/289,648

(22) PCT Filed: Nov. 1, 2019

(86) PCT No.: PCT/KR2019/014679
§ 371 (c)(1),
(2) Date: Apr. 28, 2021

(87) PCT Pub. No.: WO2020/091494
PCT Pub. Date: May 7, 2020

(65) Prior Publication Data
US 2021/0400639 A1    Dec. 23, 2021

Related U.S. Application Data

(60) Provisional application No. 62/754,538, filed on Nov. 1, 2018.

(51) Int. Cl.
*H04W 72/04* (2023.01)
*H04W 24/08* (2009.01)

(52) U.S. Cl.
CPC .......... *H04W 72/04* (2013.01); *H04W 24/08* (2013.01)

(58) Field of Classification Search
CPC ............................. H04W 72/04; H04W 24/08
See application file for complete search history.

(56) References Cited

U.S. PATENT DOCUMENTS

| | | | |
|---|---|---|---|
| 2003/0007453 A1* | 1/2003 | Ogier | H04L 47/17 370/468 |
| 2018/0212800 A1* | 7/2018 | Park | H04L 5/0057 |
| 2019/0075014 A1* | 3/2019 | Zhou | H04W 74/0833 |
| 2020/0107236 A1* | 4/2020 | Tseng | H04W 4/50 |

OTHER PUBLICATIONS

Huawei, HiSilicon, "Study sidelink resource allocation mechanism," R2-1815199, 3GPP TSG-RAN WG2 # 103bis, Chengdu, China, dated Oct. 8-12, 2018, 6 pages.

Intel Corporation, "Coexistence Mechanisms for eV2X Services," R1-1810781, 3GPP TSG RAN WG1 Meeting #94bis, Chengdu, China, dated Oct. 8-12, 2018, 12 pages.

(Continued)

*Primary Examiner* — Duc C Ho
(74) *Attorney, Agent, or Firm* — Fish & Richardson P.C.

(57) ABSTRACT

A method by which a first device performs sidelink transmission and a device for supporting same are provided. The method can comprise the steps of: receiving, from a second device, assistance information related to one or more resources for sidelink communication; selecting a transmission resource from among the one or more resources on the basis of the assistance information; and performing sidelink transmission on the transmission resource.

10 Claims, 30 Drawing Sheets

(56) References Cited

OTHER PUBLICATIONS

Intel Corporation, "Summary of offline discussion on NR-V2X AI—7.2.4.1.4 Resource Allocation Mechanism," R1-1811963, 3GPP TSG RAN WG1 Meeting #94bis, Chengdu, Chengdu, China, dated Oct. 8-12, 2018, 10 pages.
InterDigital Inc., "Resource Allocation Features to Support NR V2X Requirements," R2-1814016, 3GPP RAN WG2 Meeting #103bis, Chengdu, China, dated Oct. 8-12, 2018, 6 pages.
InterDigital Inc., "Resource Allocation for NR V2X," R1-1811115, 3GPP RAN WG1 Meeting #94b, Chengdu, China, dated Oct. 8-12, 2018, 7 pages.

* cited by examiner

FIG. 9
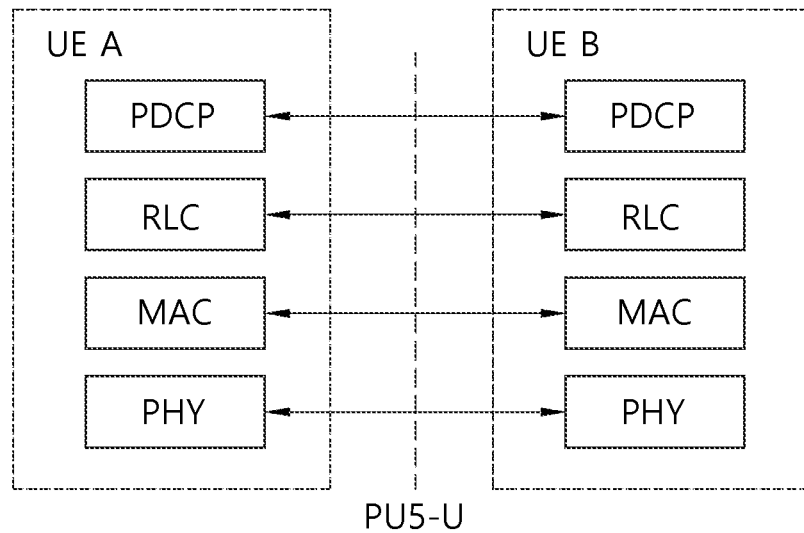
(a)
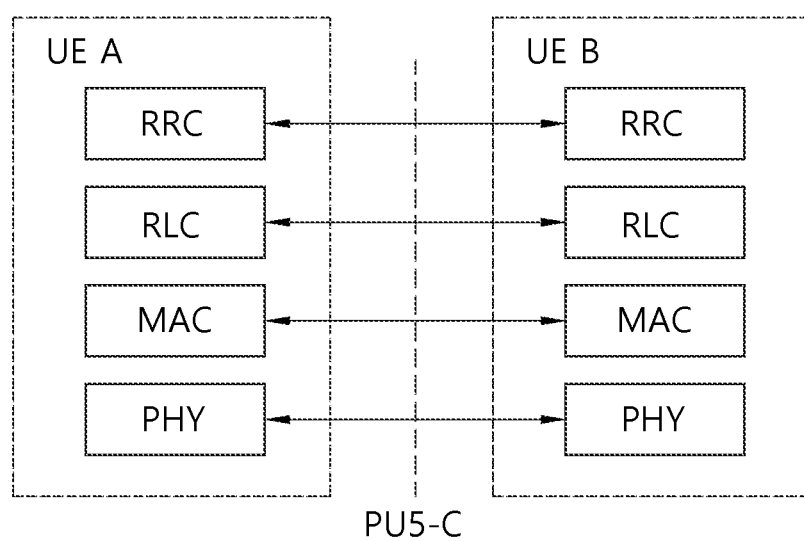
(b)

FIG. 10
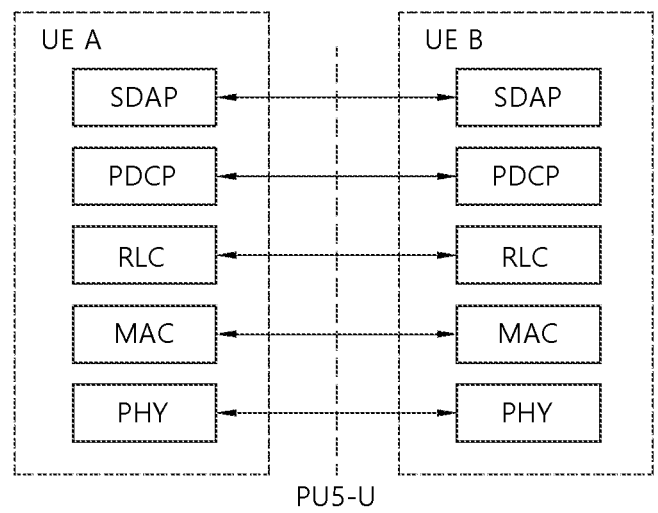
(a)
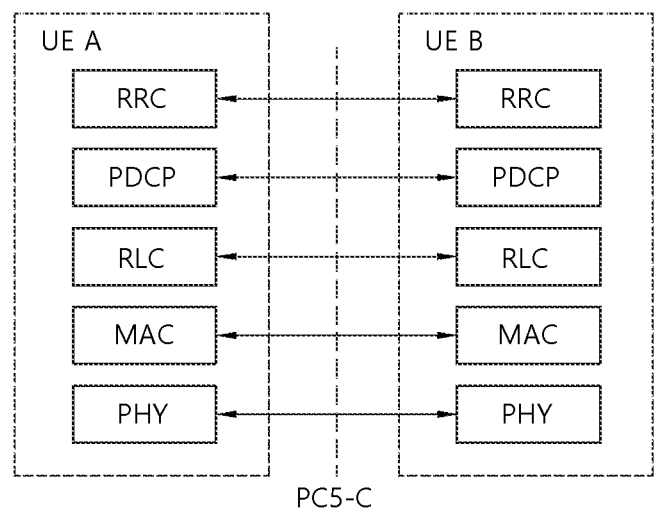
(b)

METHOD AND DEVICE FOR ALLOCATING RESOURCES IN NR V2X

CROSS-REFERENCE TO RELATED APPLICATIONS

This application is a National Stage application under 35 U.S.C. § 371 of International Application No. PCT/KR2019/014679, filed on Nov. 1, 2019, which claims the benefit of U.S. Provisional Application No. 62/754,538, filed on Nov. 1, 2018. The disclosures of the prior applications are incorporated by reference in their entirety.

BACKGROUND OF THE DISCLOSURE

Field of the Disclosure

The present disclosure relates to a wireless communication system.

Related Art

A wireless communication system is a multiple access system that supports communication of multiple users by sharing available system resources (e.g., a bandwidth, transmission power, etc.) among them. Examples of multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

Meanwhile, sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive MTC, Ultra-Reliable and Low Latency Communication (URLLC), and so on, may be referred to as a new radio access technology (RAT) or new radio (NR). Herein, the NR may also support vehicle-to-everything (V2X) communication.

SUMMARY OF THE DISCLOSURE

Technical Objects

Meanwhile, in a mode in which a UE schedules SL resource(s) by itself, the UE may receive assistance information related to resource allocation from other devices. In case assisting device(s) transmit assistance information a transmitting UE, it is necessary to propose what information is included in the assistance information. In addition, it is necessary to propose a procedure for the transmitting UE to select resource(s) by using the received assistance information.

Technical Solutions

According to an embodiment, a method for performing, by a first device (100), sidelink (SL) transmission is provided. The method may comprise: receiving, from a second device (200), assistance information related to one or more resources for SL communication; selecting a transmission resource from among the one or more resources based on the assistance information; and performing the SL transmission on the transmission resource.

According to an embodiment, a method for receiving, by a second device (200), sidelink (SL) information is provided. The method may comprise: transmitting, to a first device (100), assistance information related to one or more resources for SL communication; and receiving, from the first device (100), the SL information, on a resource selected based on the assistance information.

According to an embodiment, a first device (100) configured for performing sidelink (SL) transmission is provided. The first device may comprise: one or more memories (104); one or more transceivers (106); and one or more processors (102) connecting the one or more memories (104) and the one or more transceivers (106). The one or more processors (102) may be configured to: control the one or more transceivers (106) to receive, from a second device (200), assistance information related to one or more resources for SL communication; select a transmission resource from among the one or more resources based on the assistance information; and control the one or more transceivers (106) to perform the SL transmission on the transmission resource.

Effects of the Disclosure

A UE can efficiently perform SL communication.

BRIEF DESCRIPTION OF THE DRAWINGS

FIG. 9 shows a protocol stack for a SL communication, in accordance with an embodiment of the present disclosure.

FIG. 10 shows a protocol stack for a SL communication, in accordance with an embodiment of the present disclosure.

DESCRIPTION OF EXEMPLARY EMBODIMENTS

In various embodiments of the present disclosure, it shall be interpreted that "/" and "," indicate "and/or". For example, "A/B" may mean "A and/or B". Additionally, "A, B" may also mean "A and/or B". Moreover, "A/B/C" may mean "at least one of A, B and/or C". Furthermore, "A, B, C" may also mean "at least one of A, B and/or C".

Furthermore, in various embodiments of the present disclosure, it shall be interpreted that "or" indicates "and/or". For example, "A or B" may include "only A", "only B", and/or "both A and B". In other words, in various embodiments of the present disclosure, it shall be interpreted that "or" indicates "additionally or alternatively".

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A, which is a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features of the present disclosure will not be limited only to this.

Figure 1:
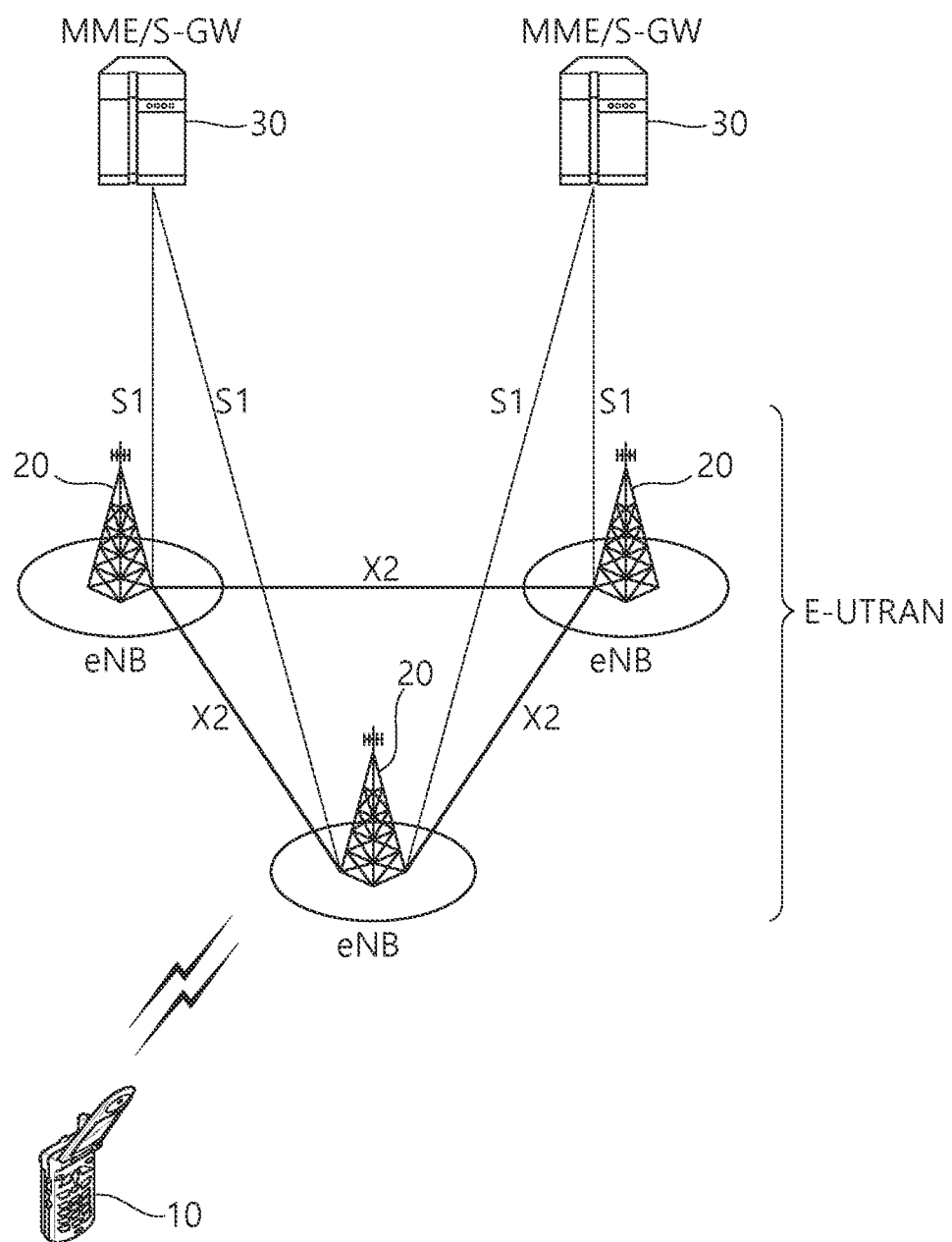
FIG. 1 shows a structure of an LTE system, in accordance with an embodiment of the present disclosure.

FIG. 1 shows a structure of an LTE system, in accordance with an embodiment of the present disclosure. This may also be referred to as an Evolved-UMTS Terrestrial Radio Access Network (E-UTRAN), or a Long Term Evolution (LTE)/LTE-A system.

Referring to FIG. 1, the E-UTRAN includes a base station (BS) (20), which provides a control plane and a user plane to a user equipment (UE) (10). The UE (10) may be fixed or mobile and may also be referred to by using different terms, such as Mobile Station (MS), User Terminal (UT), Subscriber Station (SS), Mobile Terminal (MT), wireless device, and so on. The base station (20) refers to a fixed station that communicates with the UE (10) and may also be referred to by using different terms, such as evolved-NodeB (eNB), Base Transceiver System (BTS), Access Point (AP), and so on.

The base stations (20) are interconnected to one another through an X2 interface. The base stations (20) are connected to an Evolved Packet Core (EPC) (30) through an S1 interface. More specifically, the base station (20) are connected to a Mobility Management Entity (MME) through an S1-MME interface and connected to Serving Gateway (S-GW) through an S1-U interface.

The EPC (30) is configured of an MME, an S-GW, and a Packet Data Network-Gateway (P-GW). The MME has UE access information or UE capability information, and such information may be primarily used in UE mobility management. The S-GW is a gateway having an E-UTRAN as its endpoint. And, the P-GW is a gateway having a Packet Data Network (PDN) as its endpoint.

Layers of a radio interface protocol between the UE and the network may be classified into a first layer (L1), a second layer (L2), and a third layer (L3) based on the lower three layers of an open system interconnection (OSI) model, which is well-known in the communication system. Herein, a physical layer belonging to the first layer provides a physical channel using an Information Transfer Service, and a Radio Resource Control (RRC) layer, which is located in the third layer, executes a function of controlling radio resources between the UE and the network. For this, the RRC layer exchanges RRC messages between the UE and the base station.

Figure 2:
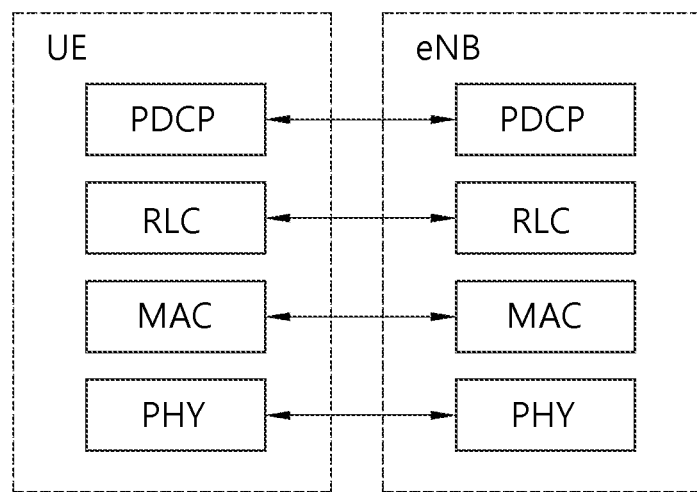
FIG. 2 shows a radio protocol architecture of a user plane, in accordance with an embodiment of the present disclosure.
Figure 3:
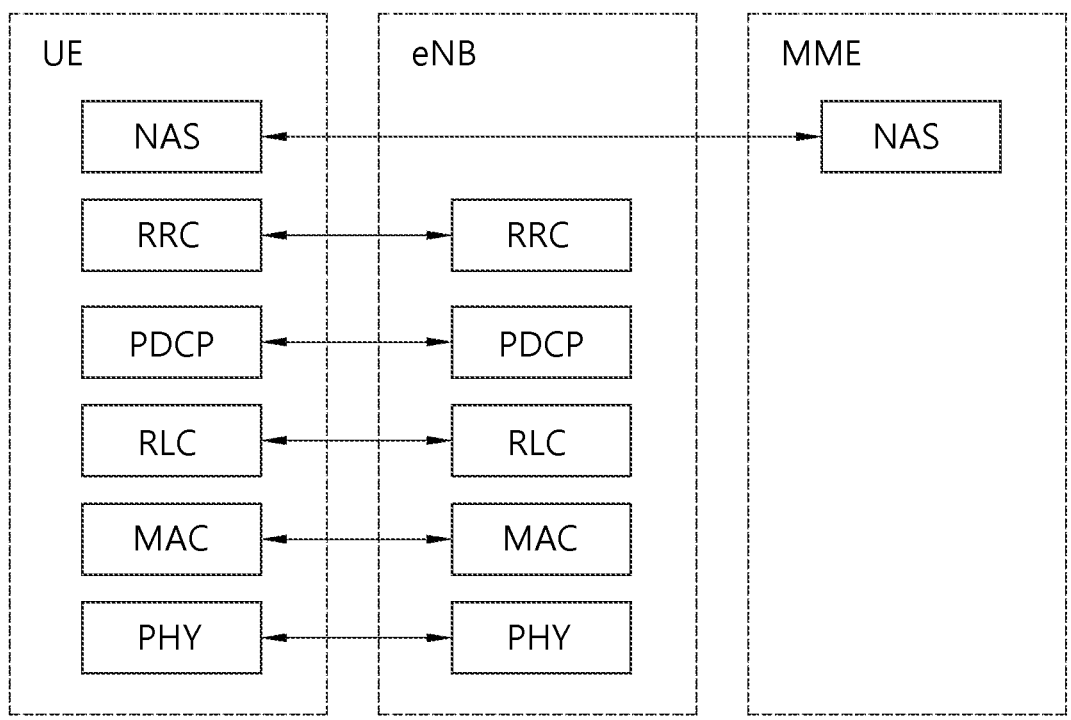
FIG. 3 shows a radio protocol architecture of a control plane, in accordance with an embodiment of the present disclosure.

FIG. 2 shows a radio protocol architecture of a user plane, in accordance with an embodiment of the present disclosure. FIG. 3 shows a radio protocol architecture of a control plane, in accordance with an embodiment of the present disclosure. The user plane is a protocol stack for user data transmission, and the control plane is a protocol stack for control signal transmission.

Referring to FIG. 2 and FIG. 3, a physical (PHY) layer belongs to the L1. A physical (PHY) layer provides an information transfer service to a higher layer through a physical channel. The PHY layer is connected to a medium access control (MAC) layer. Data is transferred (or transported) between the MAC layer and the PHY layer through a transport channel. The transport channel is sorted (or categorized) depending upon how and according to which characteristics data is being transferred through the radio interface.

Between different PHY layers, i.e., a PHY layer of a transmitter and a PHY layer of a receiver, data is transferred through the physical channel. The physical channel may be modulated by using an orthogonal frequency division multiplexing (OFDM) scheme and uses time and frequency as radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure various quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

The radio resource control (RRC) layer is defined only in a control plane. And, the RRC layer performs a function of controlling logical channel, transport channels, and physical channels in relation with configuration, re-configuration, and release of radio bearers. The RB refers to a logical path being provided by the first layer (PHY layer) and the second layer (MAC layer, RLC layer, Packet Data Convergence Protocol (PDCP) layer) in order to transport data between the UE and the network.

Functions of a PDCP layer in the user plane include transfer, header compression, and ciphering of user data.

Functions of a PDCP layer in the control plane include transfer and ciphering/integrity protection of control plane data.

The configuration of the RB refers to a process for specifying a radio protocol layer and channel properties in order to provide a particular service and for determining respective detailed parameters and operation methods. The RB may then be classified into two types, i.e., a signaling radio bearer (SRB) and a data radio bearer (DRB). The SRB is used as a path for transmitting an RRC message in the control plane, and the DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the base station is released.

Downlink transport channels transmitting (or transporting) data from a network to a UE include a Broadcast Channel (BCH) transmitting system information and a downlink Shared Channel (SCH) transmitting other user traffic or control messages. Traffic or control messages of downlink multicast or broadcast services may be transmitted via the downlink SCH or may be transmitted via a separate downlink Multicast Channel (MCH). Meanwhile, uplink transport channels transmitting (or transporting) data from a UE to a network include a Random Access Channel (RACH) transmitting initial control messages and an uplink Shared Channel (SCH) transmitting other user traffic or control messages.

Logical channels existing at a higher level than the transmission channel and being mapped to the transmission channel may include a Broadcast Control Channel (BCCH), a Paging Control Channel (PCCH), a Common Control Channel (CCCH), a Multicast Control Channel (MCCH), a Multicast Traffic Channel (MTCH), and so on.

A physical channel is configured of a plurality of OFDM symbols in the time domain and a plurality of sub-carriers in the frequency domain. One subframe is configured of a plurality of OFDM symbols in the time domain. A resource block is configured of a plurality of OFDM symbols and a plurality of sub-carriers in resource allocation units. Additionally, each subframe may use specific sub-carriers of specific OFDM symbols (e.g., first OFDM symbol) of the corresponding subframe for a Physical Downlink Control Channel (PDCCH), i.e., L1/L2 control channels. A Transmission Time Interval (TTI) refers to a unit time of a subframe transmission.

Figure 4:
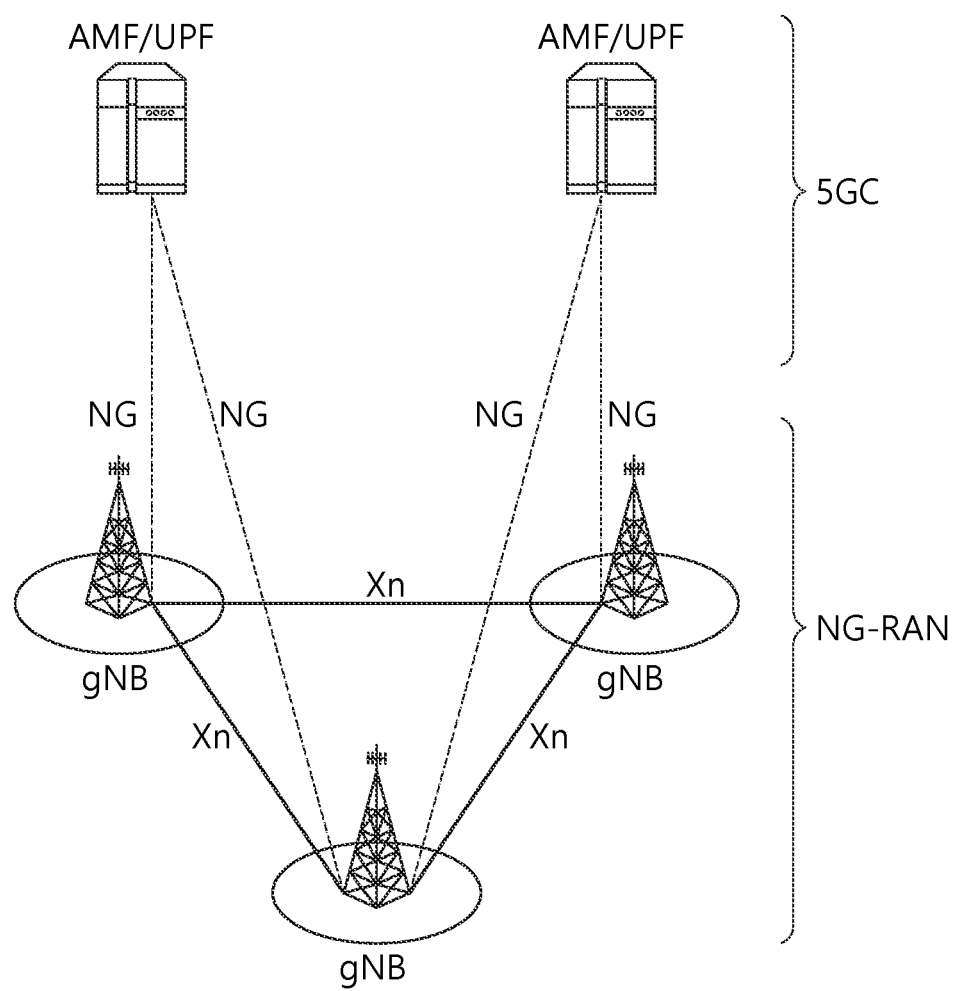
FIG. 4 shows a structure of an NR system, in accordance with an embodiment of the present disclosure.

FIG. 4 shows a structure of an NR system, in accordance with an embodiment of the present disclosure.

Referring to FIG. 4, a Next Generation-Radio Access Network (NG-RAN) may include a next generation-Node B (gNB) and/or eNB providing a user plane and control plane protocol termination to a user. FIG. 4 shows a case where the NG-RAN includes only the gNB. The gNB and the eNB are connected to one another via Xn interface. The gNB and the eNB are connected to one another via $5^{th}$ Generation (5G) Core Network (5GC) and NG interface. More specifically, the gNB and the eNB are connected to an access and mobility management function (AMF) via NG-C interface, and the gNB and the eNB are connected to a user plane function (UPF) via NG-U interface.

Figure 5:
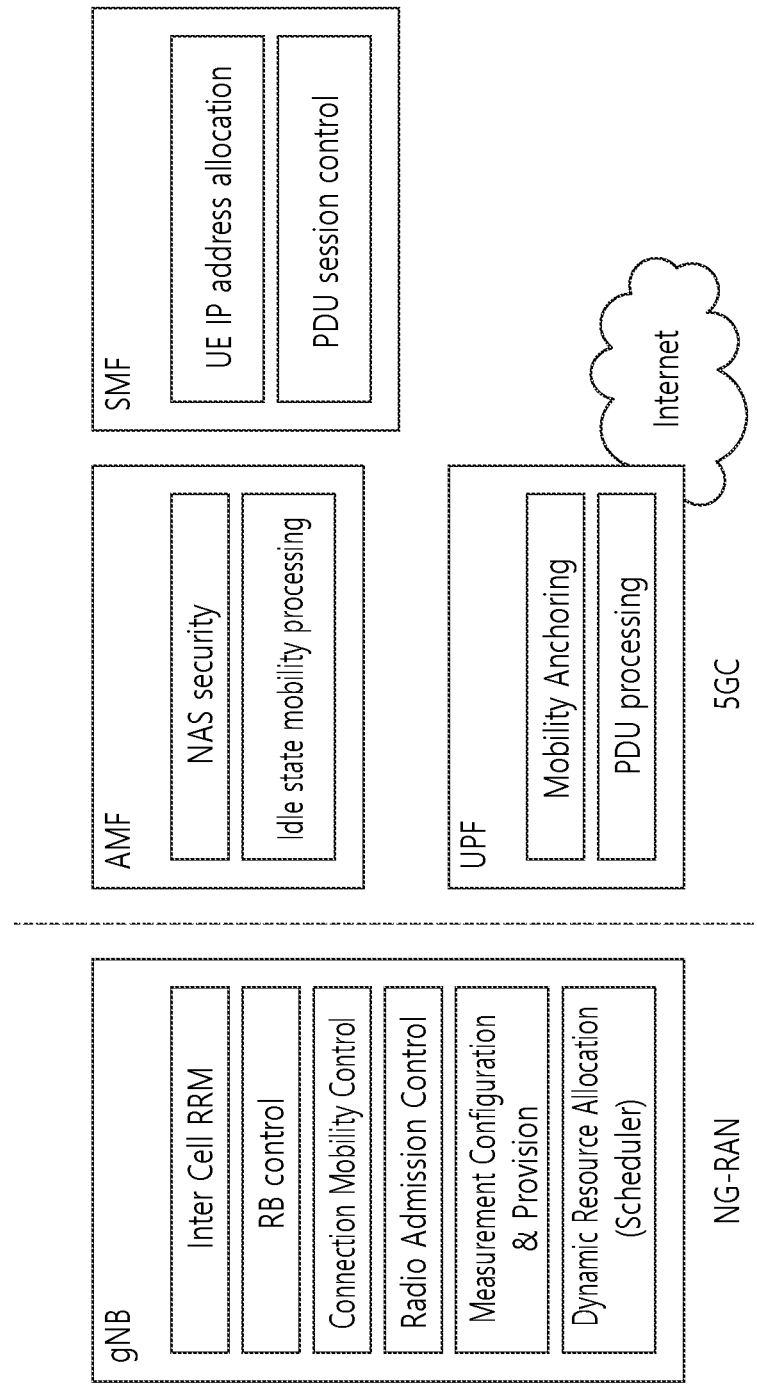
FIG. 5 shows a functional division between an NG-RAN and a 5GC, in accordance with an embodiment of the present disclosure.

FIG. 5 shows a functional division between an NG-RAN and a 5GC, in accordance with an embodiment of the present disclosure.

Referring to FIG. 5, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Figure 6:
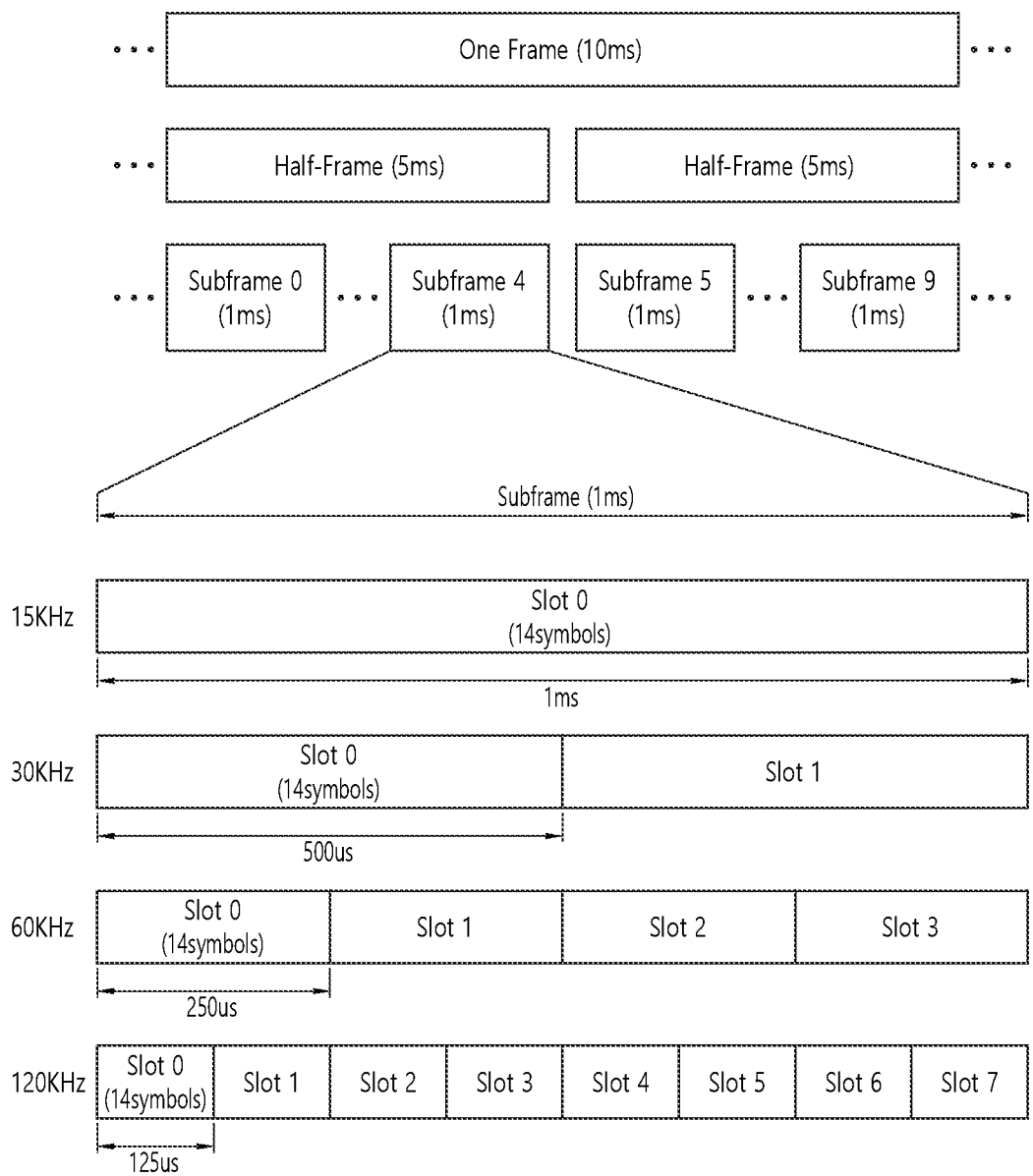
FIG. 6 shows a structure of a radio frame of an NR, in accordance with an embodiment of the present disclosure.

FIG. 6 shows a structure of a radio frame of an NR, in accordance with an embodiment of the present disclosure.

Referring to FIG. 6, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting various 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 may include an unlicensed band. The unlicensed band may be used for various purposes, e.g., the unlicensed band for vehicle-specific communication (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 7:
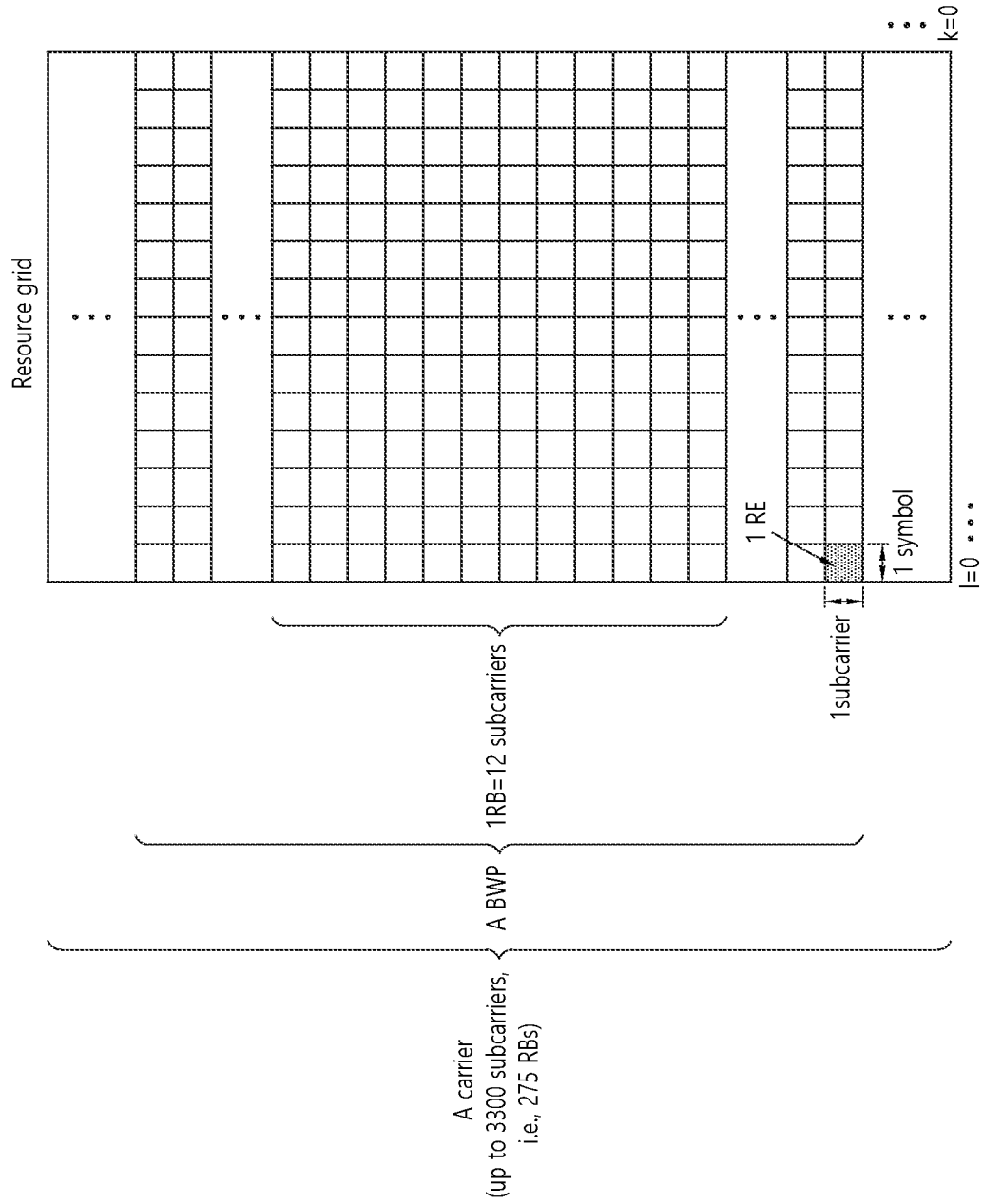
FIG. 7 shows a structure of a slot of an NR frame, in accordance with an embodiment of the present disclosure.

FIG. 7 shows a structure of a slot of an NR frame, in accordance with an embodiment of the present disclosure.

Referring to FIG. 7, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a Bandwidth Part (BWP) and a carrier will be described in detail.

The Bandwidth Part (BWP) may be a continuous set of physical resource blocks (PRBs) within a given numerology. The PRB may be selected from a continuous partial set of a common resource block (CRB) for a given numerology on a given carrier.

When using Bandwidth Adaptation (BA), a receiving bandwidth and a transmitting bandwidth of a user equipment (UE) are not required to be as wide (or large) as the bandwidth of the cell, and the receiving bandwidth and the transmitting bandwidth of the UE may be controlled (or adjusted). For example, the UE may receive information/configuration for bandwidth control (or adjustment) from a network/base station. In this case, the bandwidth control (or adjustment) may be performed based on the received information/configuration. For example, the bandwidth control (or adjustment) may include reduction/expansion of the bandwidth, position change of the bandwidth, or change in subcarrier spacing of the bandwidth.

For example, the bandwidth may be reduced during a duration with little activity in order to save power. For example, a position of the bandwidth may be relocated (or moved) from a frequency domain. For example, the position of the bandwidth may be relocated (or moved) from a frequency domain in order to enhance scheduling flexibility. For example, subcarrier spacing of the bandwidth may be changed. For example, the subcarrier spacing of the bandwidth may be changed in order to authorize different services. A subset of a total cell bandwidth of a cell may be referred to as a Bandwidth Part (BWP). BA may be performed when a base station/network configures BWPs to the UE, and when the base station/network notifies the BWP that is currently in an active state, among the BWPs, to the UE.

For example, the BWP may be one of an active BWP, an initial BWP, and/or a default BWP. For example, the UE may not monitor a downlink radio link quality in a DL BWP other than the active DL BWP within a primary cell (PCell). For example, the UE may not receive a PDCCH, a PDSCH or a CSI-RS (excluding only the RRM) from outside of the active DL BWP. For example, the UE may not trigger a Channel State Information (CSI) report for an inactive DL BWP. For example, the UE may not transmit a PUCCH or a PUSCH from outside of an inactive DL BWP. For example, in case of a downlink, an initial BWP may be given as a continuous RB set for an RMSI CORESET (that is configured by a PBCH). For example, in case of an uplink, an initial BWP may be given by a SIB for a random access procedure. For example, a default BWP may be configured by a higher layer. For example, an initial value of a default BWP may be an initial DL BWP. For energy saving, if the UE fails to detect DCI during a predetermined period of time, the UE may switch the active BWP of the UE to a default BWP.

Meanwhile, a BWP may be defined for the SL. The same SL BWP may be used for transmission and reception. For example, a transmitting UE may transmit an SL channel or SL signal within a specific BWP, and a receiving UE may receive an SL channel or SL signal within the same specific BWP. In a licensed carrier, the SL BWP may be defined separately from a Uu BWP, and the SL BWP may have a separate configuration signaling from the Uu BWP. For example, the UE may receive a configuration for an SL BWP from the base station/network. The SL BWP may be configured (in advance) for an out-of-coverage NR V2X UE and an RRC_IDLE UE. For a UE operating in the RRC_CONNECTED mode, at least one SL BWP may be activated within a carrier.

Figure 8:
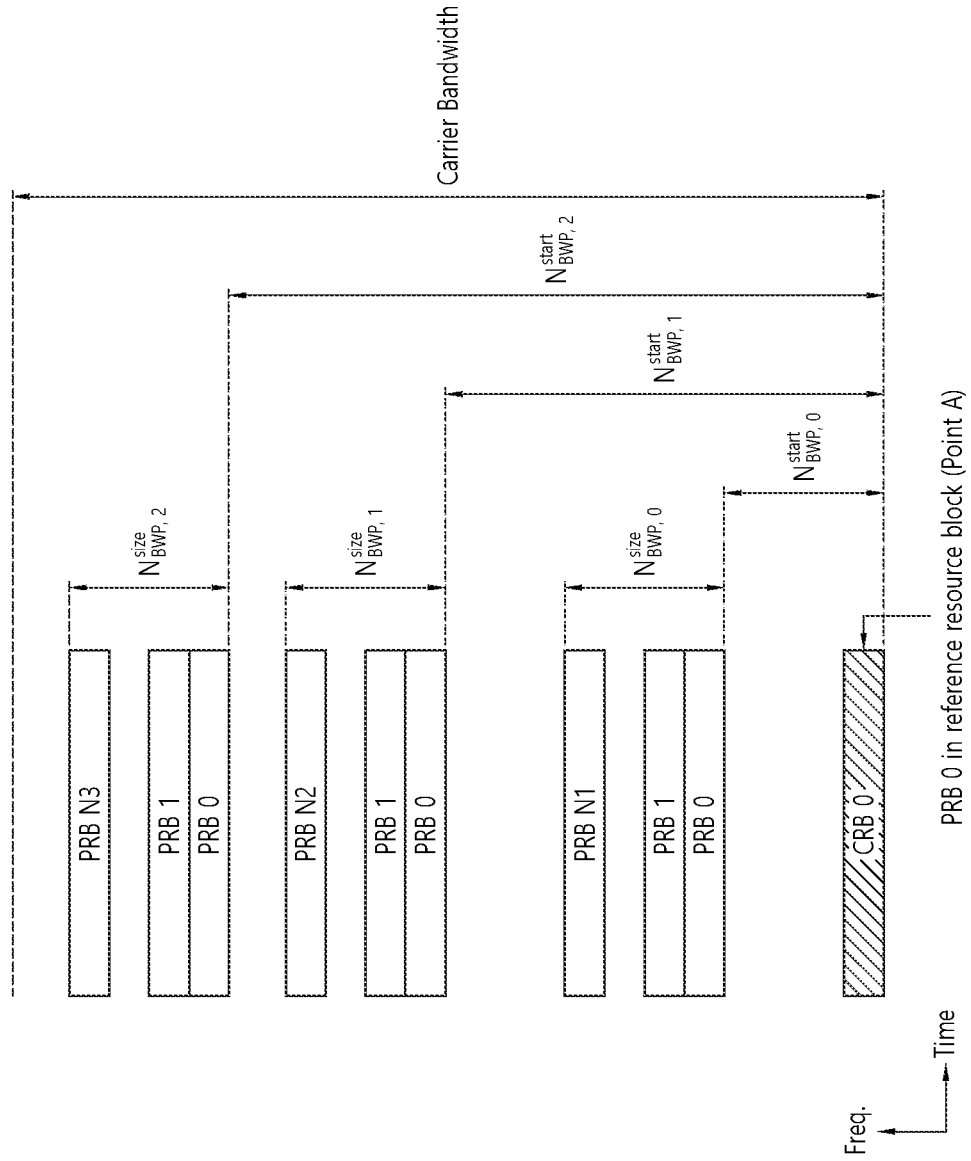
FIG. 8 shows an example of a BWP, in accordance with an embodiment of the present disclosure.

FIG. 8 shows an example of a BWP, in accordance with an embodiment of the present disclosure. In the embodiment of FIG. 8, it is assumed that three BWPs exist.

Referring to FIG. 8, a common resource block (CRB) may be a carrier resource block that is numerated from one end of a carrier band to another end. And, a PRB may be a resource block that is numerated within each BWP. Point A may indicate a common reference point for a resource block grid.

A BWP may be configured by Point A, an offset ($N^{start}_{BWP}$) from Point A, and a bandwidth ($N^{size}_{BWP}$). For example, Point A may be an external reference point of a PRB of a carrier having subcarrier 0 of all numerologies (e.g., all numerologies being supported by the network within the corresponding carrier) aligned therein. For example, the offset may be a PRB distance between a lowest subcarrier within a given numerology and Point A. For example, the bandwidth may be a number of PRBs within the given numerology.

Hereinafter, V2X or SL communication will be described.

FIG. 9 shows a protocol stack for a SL communication, in accordance with an embodiment of the present disclosure. More specifically, (a) of FIG. 9 shows a user plane protocol stack of LTE, and (b) of FIG. 9 shows a control plane protocol stack of LTE.

FIG. 10 shows a protocol stack for a SL communication, in accordance with an embodiment of the present disclosure. More specifically, (a) of FIG. 10 shows a user plane protocol stack of NR, and (b) of FIG. 10 shows a control plane protocol stack of NR.

Hereinafter, SL Synchronization Signal (SLSS) and synchronization information will be described.

SLSS is a SL specific sequence, which may include a Primary Sidelink Synchronization Signal (PSSS) and a Secondary Sidelink Synchronization Signal (SSSS). The PSSS may also be referred to as a Sidelink Primary Synchronization Signal (S-PSS), and the SSSS may also be referred to as a Sidelink Secondary Synchronization Signal (S-SSS).

A Physical Sidelink Broadcast Channel (PSBCH) may be a (broadcast) channel through which basic (system) information that should first be known by the user equipment (UE) before transmitting and receiving SL signals. For example, the basic information may be information related to SLSS, a Duplex mode (DM), Time Division Duplex Uplink/Downlink (TDD UL/DL) configuration, information related to a resource pool, application types related to SLSS, a subframe offset, broadcast information, and so on.

The S-PSS, the S-SSS, and the PSBCH may be included in a block format (e.g., a SL SS/PSBCH block, hereinafter referred to as Sidelink-Synchronization Signal Block (S-SSB)). The S-SSB may have the same numerology (i.e., SCS and CP length) as a Physical Sidelink Control Channel (PSCCH)/Physical Sidelink Shared Channel (PSSCH) within the carrier, and a transmission bandwidth may exist within a (pre-)configured SL Bandwidth Part (BWP). And, a frequency position of the S-SSB may be (pre-)configured. Therefore, the UE is not required to perform a hypothesis detection in order to discover the S-SSB in the carrier.

Each SLSS may have a physical layer SL synchronization identity (ID), and the respective value may be equal to any one value ranging from 0 to 335. Depending upon one of the above-described values that is used, a synchronization source may also be identified. For example, values of 0, 168, 169 may indicate global navigation satellite systems (GNSS), values from 1 to 167 may indicate base stations, and values from 170 to 335 may indicate that the source is outside of the coverage. Alternatively, among the physical layer SL synchronization ID values, values 0 to 167 may be values being used by a network, and values from 168 to 335 may be values being used outside of the network coverage.

Figure 11:
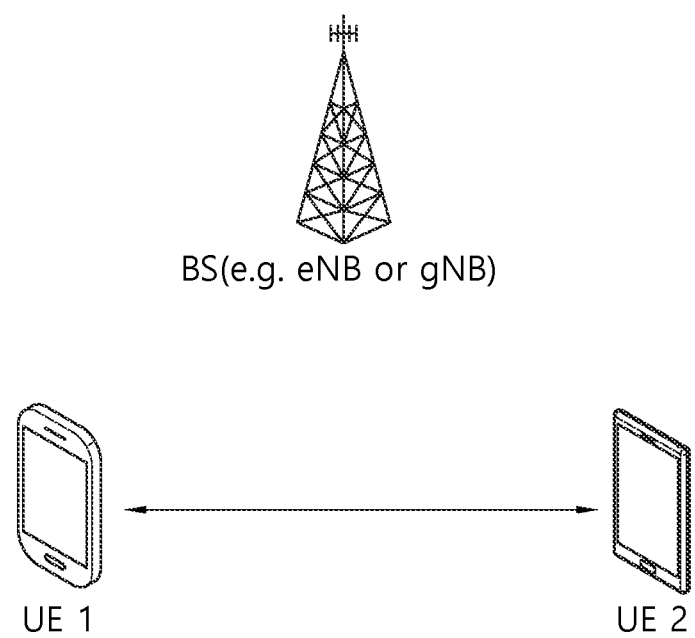
FIG. 11 shows a UE performing V2X or SL communication, in accordance with an embodiment of the present disclosure.

FIG. 11 shows a UE performing V2X or SL communication, in accordance with an embodiment of the present disclosure.

Referring to FIG. 11, in V2X/SL communication, the term terminal may mainly refer to a terminal (or equipment) used by a user. However, in case a network equipment, such as a base station, transmits and receives signals in accordance with a communication scheme between the network equipment and a user equipment (UE) (or terminal), the base station may also be viewed as a type of user equipment (or terminal).

User equipment 1 (UE1) may select a resource unit corresponding to a specific resource within a resource pool, which refers to a set of resources, and UE1 may then be operated so as to transmit a SL signal by using the corresponding resource unit. User equipment 2 (UE2), which is to a receiving UE, may be configured with a resource pool to which UE1 can transmit signals, and may then detect signals of UE1 from the corresponding resource pool.

Herein, in case UE1 is within a connection range of the base station, the base station may notify the resource pool. Conversely, in case UE1 is outside a connection range of the base station, another UE may notify the resource pool or a pre-determined resource may be used.

Generally, a resource pool may be configured in a plurality of resource units, and each UE may select one resource unit or a plurality of resource units and may use the selected resource unit(s) for its SL signal transmission.

Figure 12:
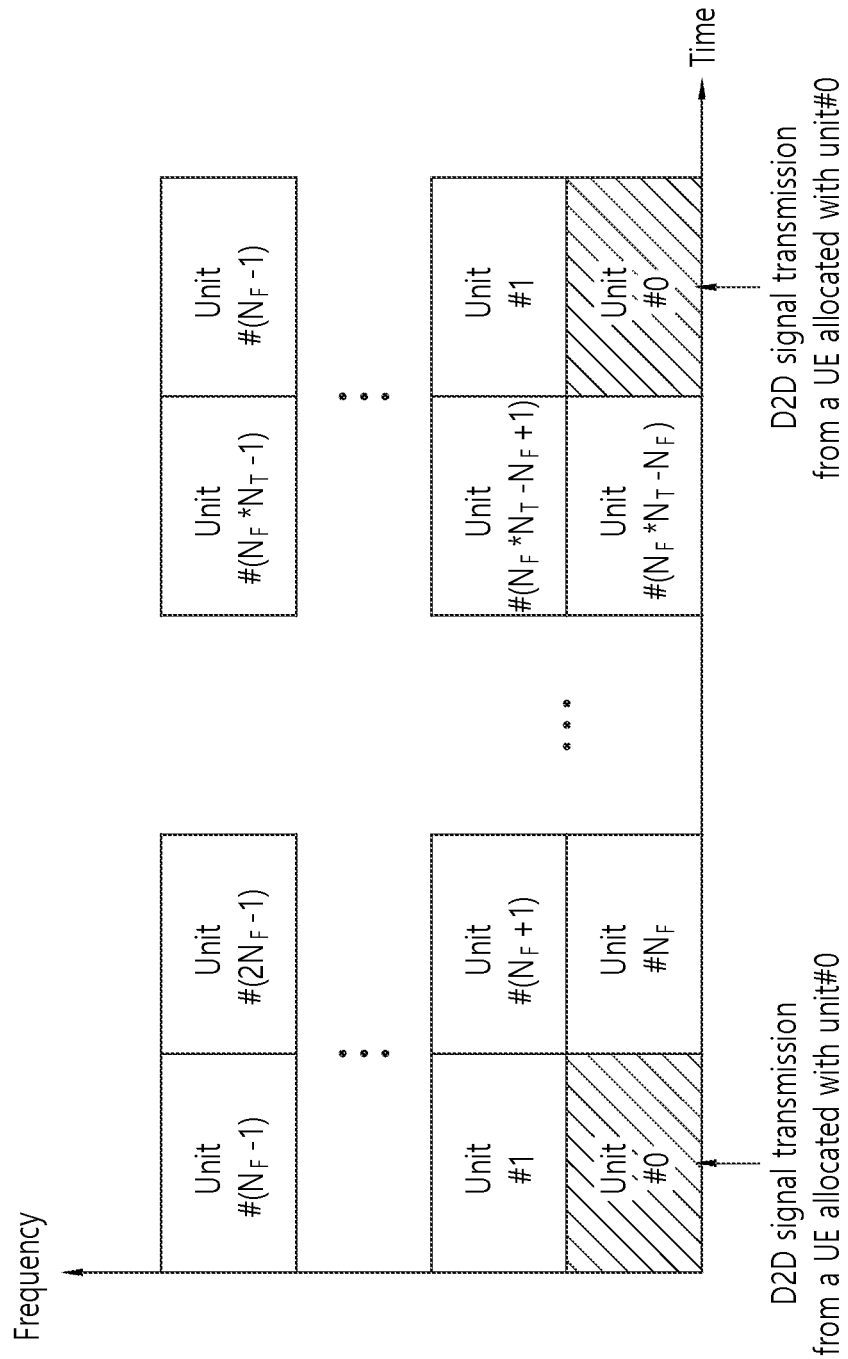
FIG. 12 shows a resource unit for V2X or SL communication, in accordance with an embodiment of the present disclosure.

FIG. 12 shows a resource unit for V2X or SL communication, in accordance with an embodiment of the present disclosure.

Referring to FIG. 12, the total frequency resources of the resource pool may be divided into $N_F$ number of resource units, the total time resources of the resource pool may be divided into $N_T$ number of resource units. Therefore, a total of $N_F*N_T$ number of resource units may be defined in the resource pool. FIG. 12 shows an example of a case where the corresponding resource pool is repeated at a cycle of $N_T$ number of subframes.

As shown in FIG. 12, one resource unit (e.g., Unit #0) may be periodically and repeatedly indicated. Alternatively, in order to achieve a diversity effect in the time or frequency level (or dimension), an index of a physical resource unit to which a logical resource unit is mapped may be changed to a pre-determined pattern in accordance with time. In such resource unit structure, the resource pool may refer to a set of resource units that can be used for a transmission that is performed by a user equipment (UE), which intends to transmit SL signals.

The resource pool may be segmented to multiple types. For example, depending upon the content of a SL signal being transmitted from each resource pool, the resource pool may be divided as described below.

(1) Scheduling Assignment (SA) may be a signal including information, such as a position of a resource that is used for the transmission of a SL data channel, a Modulation and Coding Scheme (MCS) or Multiple Input Multiple Output (MIMO) transmission scheme needed for the modulation of other data channels, a Timing Advance (TA), and so on. The SA may also be multiplexed with SL data within the same resource unit and may then be transmitted, and, in this case, an SA resource pool may refer to a resource pool in which the SA is multiplexed with the SL data and then transmitted. The SA may also be referred to as a SL control channel.

(2) A Physical Sidelink Shared Channel (PSSCH) may be a resource pool that is used by a transmitting UE for transmitting user data. If the SA is multiplexed with SL data within the same resource unit and then transmitted, only a SL data channel excluding the SA information may be transmitted from the resource pool that is configured for the SL data channel. In other words, REs that were used for transmitting SA information within a separate resource unit of the SA resource pool may still be used for transmitting SL data from the resource pool of a SL data channel.

(3) A discovery channel may be a resource pool that is used by the transmitting UE for transmitting information, such as its own ID. By doing so, the transmitting UE may allow a neighboring UE to discover the transmitting UE.

Even if the content of the above-described SL signal is the same, different resource pools may be used depending upon the transmission/reception attribute of the SL signal. For example, even if the same SL data channel or discovery message is used, the resource pool may be identified as a different resource pool depending upon a transmission timing decision method (e.g., whether the transmission is performed at a reception point of the synchronization reference signal or whether transmission is performed at the reception point by applying a consistent timing advance), a resource allocation method (e.g., whether the base station designates a transmission resource of a separate signal to a separate transmitting UE or whether a separate transmitting UE selects a separate signal transmission resource on its own from the resource pool), and a signal format (e.g., a number of symbols occupied by each SL signal within a subframe or a number of subframes being used for the transmission of one SL signal) of the SL signal, signal intensity from the base station, a transmitting power intensity (or level) of a SL UE, and so on.

Hereinafter, resource allocation in a SL will be described.

Figure 13:
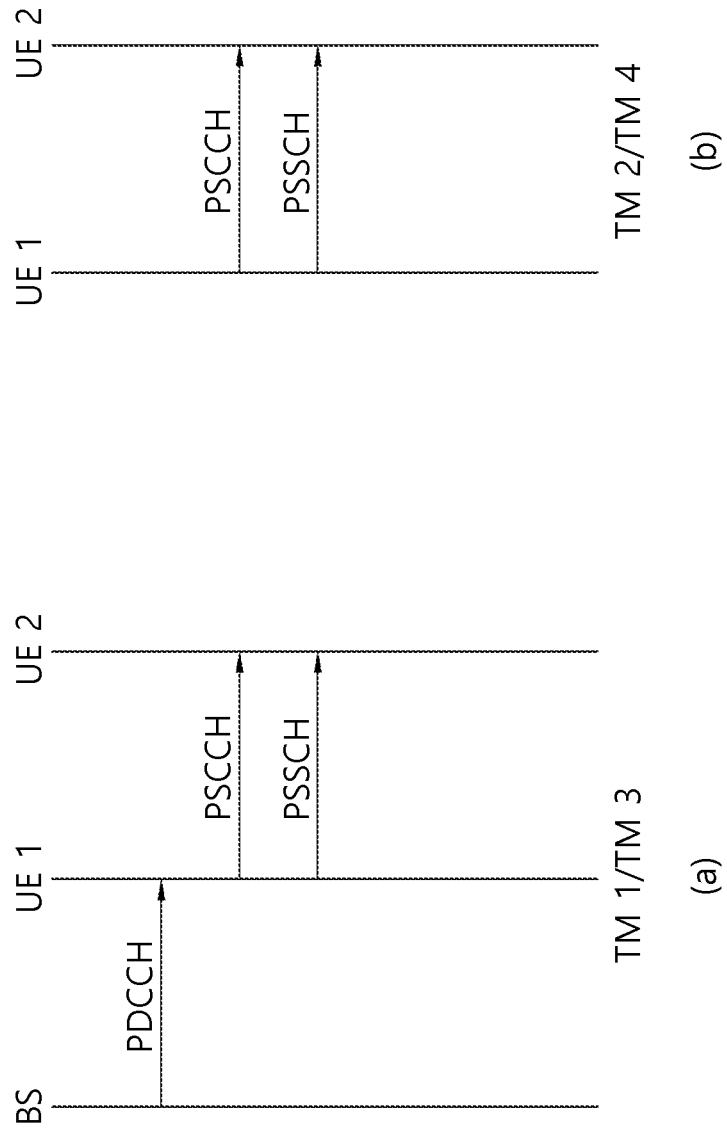
FIG. 13 shows procedures of a UE performing V2X or SL communication according to a transmission mode (TM), in accordance with an embodiment of the present disclosure.

FIG. 13 shows procedures of a UE performing V2X or SL communication according to a transmission mode (TM), in accordance with an embodiment of the present disclosure. Specifically, (a) of FIG. 13 shows a UE operation related to a transmission mode 1 or a transmission mode 3, and (b) of FIG. 13 shows a UE operation related to a transmission mode 2 or a transmission mode 4.

Referring to (a) of FIG. 13, in transmission modes 1/3, the base station performs resource scheduling to UE1 via PDCCH (more specifically, Downlink Control Information (DCI)), and UE1 performs SL/V2X communication with UE2 according to the corresponding resource scheduling. After transmitting sidelink control information (SCI) to UE2 via physical sidelink control channel (PSCCH), UE1 may transmit data based on the SCI via physical sidelink shared channel (PSSCH). In case of an LTE SL, transmission mode 1 may be applied to a general SL communication, and transmission mode 3 may be applied to a V2X SL communication.

Referring to (b) of FIG. 13, in transmission modes 2/4, the UE may schedule resources on its own. More specifically, in case of LTE SL, transmission mode 2 may be applied to a general SL communication, and the UE may select a resource from a predetermined resource pool on its own and may then perform SL operations. Transmission mode 4 may be applied to a V2X SL communication, and the UE may carry out a sensing/SA decoding procedure, and so on, and select a resource within a selection window on its own and may then perform V2X SL operations. After transmitting the SCI to UE2 via PSCCH, UE1 may transmit SCI-based data via PSSCH. Hereinafter, the transmission mode may be abbreviated to the term mode.

In case of NR SL, at least two types of SL resource allocation modes may be defined. In case of mode 1, the base station may schedule SL resources that are to be used for SL transmission. In case of mode 2, the user equipment (UE) may determine a SL transmission resource from SL resources that are configured by the base station/network or predetermined SL resources. The configured SL resources or the pre-determined SL resources may be a resource pool. For example, in case of mode 2, the UE may autonomously select a SL resource for transmission. For example, in case of mode 2, the UE may assist (or help) SL resource selection of another UE. For example, in case of mode 2, the UE may be configured with an NR configured grant for SL transmission. For example, in case of mode 2, the UE may schedule SL transmission of another UE. And, mode 2 may at least support reservation of SL resources for blind retransmission.

Procedures related to sensing and resource (re-)selection may be supported in resource allocation mode 2. The sensing procedure may be defined as a process decoding the SCI from another UE and/or SL measurement. The decoding of the SCI in the sensing procedure may at least provide information on a SL resource that is being indicated by a UE transmitting the SCI. When the corresponding SCI is decoded, the sensing procedure may use L1 SL Reference Signal Received Power (RSRP) measurement, which is based on SL Demodulation Reference Signal (DMRS). The resource (re-)selection procedure may use a result of the sensing procedure in order to determine the resource for the SL transmission.

Figure 14:
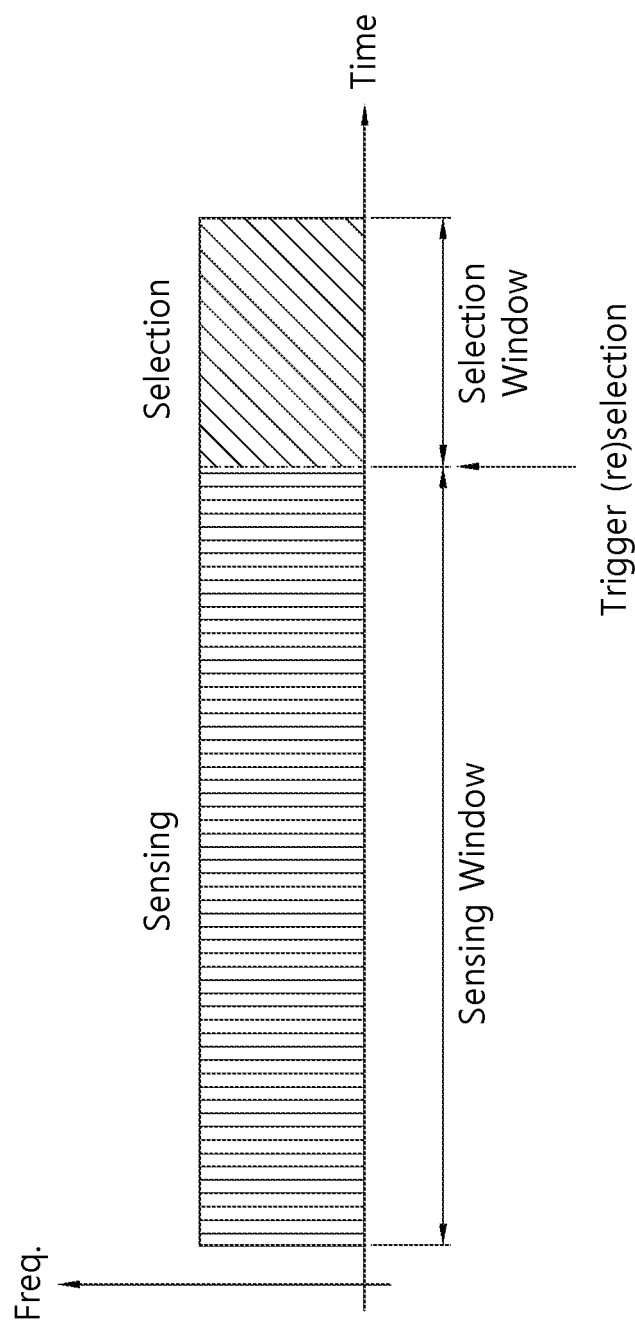
FIG. 14 shows a method of selecting a transmission resource by a UE, in accordance with an embodiment of the present disclosure.

FIG. 14 shows a method of selecting a transmission resource by a UE, in accordance with an embodiment of the present disclosure.

Referring to FIG. 14, the UE may identify transmission resources reserved by another UE or resources being used by another UE via sensing within a sensing window, and, after excluding the identified resources from a selection window, the UE may randomly select a resource from resources having low interference among the remaining resources.

For example, within the sensing window, the UE may decode the PSCCH including information on the cycles of the reserved resources, and, then, the UE may measure a PSSCH RSRP from resources that are periodically determined based on the PSCCH. The UE may exclude resources having the PSSCH RSRP that exceeds a threshold value from the selection window. Thereafter, the UE may randomly select a SL resource from the remaining resources within the selection window.

Alternatively, the UE may measure a Received Signal Strength Indicator (RSSI) of the periodic resources within the sensing window and may then determine the resources having low interference (e.g., the lower 20% of the resources). Additionally, the UE may also randomly select a SL resource from the resources included in the selection window among the periodic resources. For example, in case the UE fails to perform decoding of the PSCCH, the UE may use the above described methods.

Figure 15:
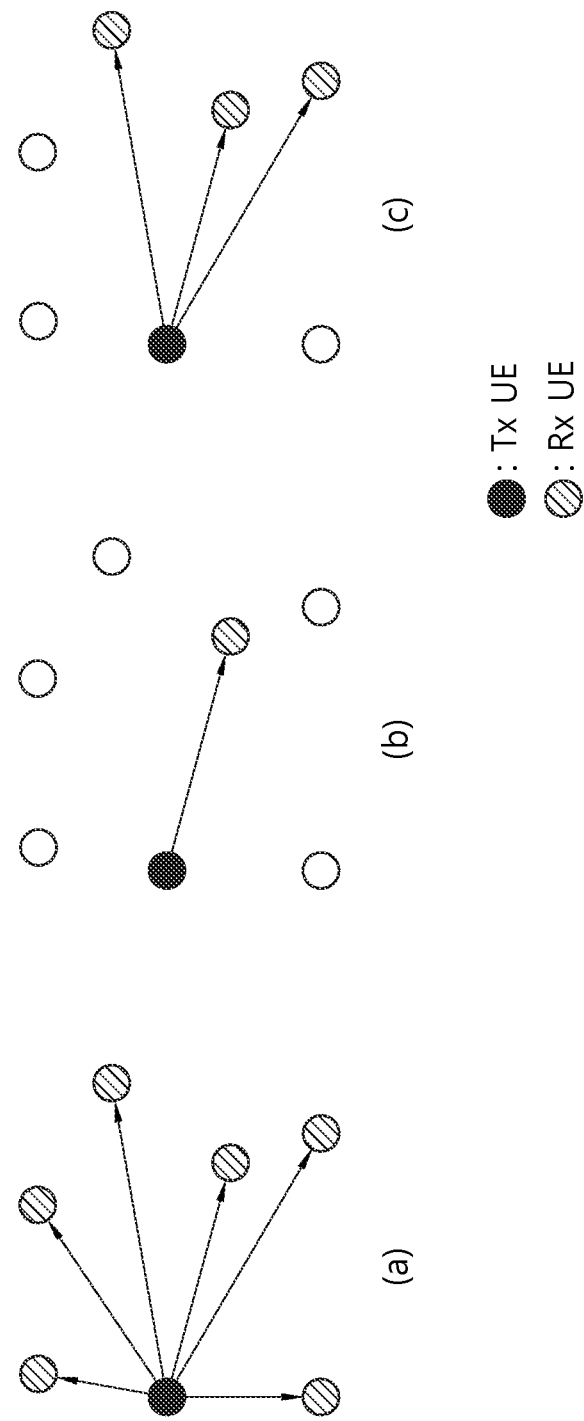
FIG. 15 shows three different cast types, in accordance with an embodiment of the present disclosure.

FIG. 15 shows three different cast types, in accordance with an embodiment of the present disclosure.

More specifically, (a) of FIG. 15 shows a broadcast type SL communication, (b) of FIG. 15 shows a unicast type SL communication, and (c) of FIG. 15 shows a groupcast type SL communication. In case of the broadcast type SL communication, the UE may perform one-to-one communication with another UE. And, in case of the unicast type SL communication, the UE may perform SL communication with one or more other UEs within the group to which the corresponding UE belongs. In the various embodiments of the present disclosure, the SL groupcast communication may be replaced with SL multicast communication, SL one-to-many communication, and so on.

Hereinafter, a Hybrid Automatic Repeat Request (HARQ) procedure in an SL will be described in detail.

In case of SL unicast and SL groupcast, HARQ feedback and HARQ combining in a physical layer may be supported. For example, in case a receiving UE operates in a Resource Allocation Mode 1 or 2, the receiving UE may receive a PSSCH from a transmitting UE, and the receiving UE may transmit an HARQ feedback corresponding to the PSSCH to the transmitting UE by using a Sidelink Feedback Control Information (SFCI) format via Physical Sidelink Feedback Channel (PSFCH).

For example, an SL HARQ feedback may be enabled for the unicast. In this case, in a non-Code Block Group (non-CBG), the receiving UE may decode a PSCCH targeting the receiving UE, and, when the receiving UE successfully decodes a transport block related to the PSCCH, the receiving UE may generate an HARQ-ACK. Thereafter, the receiving UE may transmit the HARQ-ACK to the transmitting UE. Conversely, after the receiving UE decodes the PSCCH targeting the receiving UE, if the receiving UE fails to successfully decode a transport block related to the PSCCH, the receiving UE may generate an HARQ-NACK, and the receiving UE may transmit the HARQ-NACK to the transmitting UE.

For example, an SL HARQ feedback may be enabled for the groupcast. For example, during the non-CBG, two different types of HARQ feedback options may be supported for the groupcast.

(1) Groupcast option 1: After decoding a PSCCH targeting the receiving UE, if the receiving UE fails to decode a transport block related to the PSCCH, the receiving UE may transmit an HARQ-NACK to a transmitting UE via a PSFCH. Conversely, when a receiving UE decodes a PSCCH targeting the receiving UE, and when the receiving UE successfully decodes a transport block related to the PSCCH, the receiving UE may not transmit an HARQ-ACK to a transmitting UE.

(2) Groupcast option 2: After decoding a PSCCH targeting the receiving UE, if the receiving UE fails to decode a transport block related to the PSCCH, the receiving UE may transmit an HARQ-NACK to a transmitting UE via a PSFCH. And, when the receiving UE decodes a PSCCH targeting the receiving UE, and when the receiving UE successfully decodes a transport block related to the PSCCH, the receiving UE may transmit an HARQ-ACK to a transmitting UE via the PSFCH.

Meanwhile, as described above, the resource scheduling scheme for SL communication in NR V2X is a mode in which the base station schedules SL resource(s) (e.g., resource allocation mode 1 or mode 1) and a mode in which the UE schedules SL resource(s) by itself (e.g., resource allocation mode 2 or mode 2). Here, in the mode in which the UE schedules SL resource(s) by itself, the UE may receive assistance information related to resource allocation from other devices. For convenience of explanation, the assistance information related to resource allocation may be referred to as assistance information related to resource scheduling, assistance information related to resource selection, or assistance information.

For example, the other devices may include at least one of road side unit(s) (RSU(s)), a master UE within a specific group, specific UE(s) defined/configured by the base station, receiving UE(s), and/or normal UE(s). For example, the RSU(s) may include UE-type RSU(s) and/or BS-type RSU(s). For example, the base station may include eNB(s) and/or gNB(s). For convenience of explanation, the other devices may be referred to as assisting device(s).

Meanwhile, in case that an assisting device transmits the assistance information to a transmitting UE, it is necessary to propose information to be included in the assistance information. In addition, it is necessary to propose a procedure for the transmitting UE to select resource(s) by using the received assistance information.

Hereinafter, according to various embodiments of the present disclosure, a method for performing, by the transmitting UE, SL communication based on the assistance information and an apparatus (or device(s)) supporting the same will be described.

Figure 16:
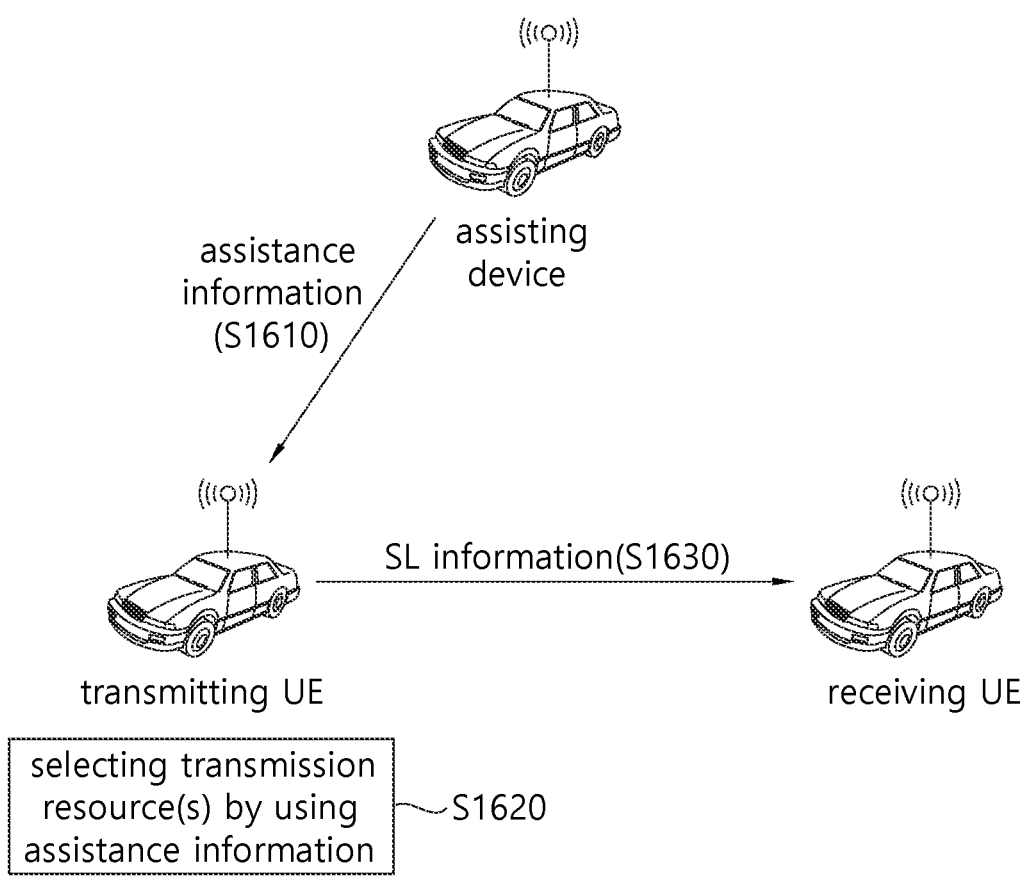
FIG. 16 shows a procedure in which the transmitting UE selects resource(s) for SL transmission by using the assistance information received from the assisting device(s) and transmits SL information to the receiving UE, in accordance with an embodiment of the present disclosure.

FIG. 16 shows a procedure in which the transmitting UE selects resource(s) for SL transmission by using the assistance information received from the assisting device(s) and transmits SL information to the receiving UE, in accordance with an embodiment of the present disclosure. In various embodiments of the present disclosure, the SL information may include at least one of SL packet(s), SL data, SL message, SL service(s), SL transport block(s) (TB(s)), SL control information, SL data channel(s), and/or SL control channel(s).

Referring to FIG. 16, in case there are an assisting device, a transmitting UE and a receiving UE, in step S1610, the transmitting UE may receive assistance information from the assisting device. In addition, in step S1620, the transmitting UE may select resource(s) by using the assistance information in a resource selection procedure for SL transmission. Then, in step S1630, the transmitting UE may transmit SL information to the receiving UE by using the selected resource(s).

However, the embodiment of FIG. 16 is only one embodiment, and the technical idea of the present disclosure is not limited to the scenario of FIG. 16. For example, in groupcast communication (e.g., platooning service), a scenario in which a group header transmits the assistance information to one or more UEs in a group may also be possible. In addition, for example, in a closed-loop communication in which assisting device(s), transmitting UE(s) and receiving UE(s) share a state of each other, the assistance information may be shared among a plurality of UEs and/or devices. In addition, for example, as in the embodiment of FIG. 17, the assisting device, which transmits the assistance information, may be the receiving UE which receives SL information.

Figure 17:
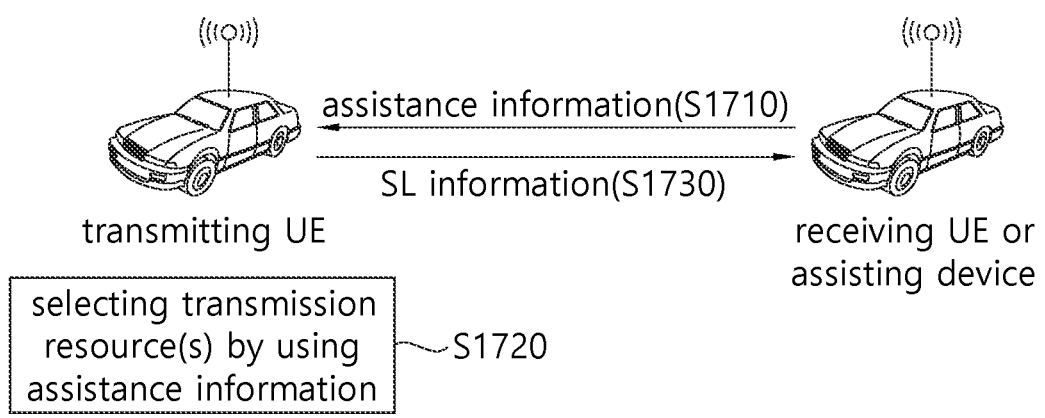
FIG. 17 shows a procedure in which the transmitting UE selects resource(s) for SL transmission by using the assistance information received from the receiving UE and transmits SL information to the receiving UE, in accordance with an embodiment of the present disclosure.

FIG. 17 shows a procedure in which the transmitting UE selects resource(s) for SL transmission by using the assistance information received from the receiving UE and transmits SL information to the receiving UE, in accordance with an embodiment of the present disclosure.

Referring to FIG. 17, in step S1710, the transmitting UE may receive the assistance information from the receiving UE. In addition, in step S1720, the transmitting UE may select resource(s) by using the assistance information in a resource selection procedure for SL transmission. In addition, in step S1730, the transmitting UE may transmit SL information to the receiving UE by using the selected resource(s). That is, the assisting device may be UE(s) that receives SL information from the transmitting UE. For example, the assisting device may be device(s)/UE(s) according to various embodiments of the present disclosure except for the transmission UE.

According to an embodiment of the present disclosure, the assistance information may include at least one of channel state measurement information, time/frequency information of a specific resource set or specific resource(s), and/or assistance information received from the base station. Hereinafter, the assistance information will be described in detail.

According to an embodiment of the present disclosure, the assistance information may include channel state measurement information.

For example, the assisting device may measure a channel state for resource(s) based on data received from one or more neighboring UEs. In addition, the assisting device may transmit the measured channel state information to the transmitting UE. For example, the channel state information measured by the assisting device may include RSRP, RSRQ, path gain, path loss, CQI, PMI, RI, SRI, CRI, interference condition (e.g., RSSI), vehicle motion, and/or CBR. For example, the channel state information for the resource(s) measured by the assisting device may be information measured for each specific time resource and/or each specific frequency resource (e.g., a sub-channel or a group of sub-channels). For example, a size of the specific time resource and/or the specific frequency resource (e.g., a size of a sub-channel or a group of sub-channels) may be previously defined for the UE and/or the assistance device. For example, parameter(s) related to the size of the specific time resource and/or the specific frequency resource may be signaled to the UE and/or the assistance device in advance.

For example, the assistance device may perform channel measurement, and the assistance device may transmit the measured channel state information to the transmitting UE. For example, the assistance device may receive a report of the channel state information measured by neighboring UEs, and the assistance device may collect and transmit the reported channel state information to the transmitting UE. For example, the channel measurement operation performed by the assistance device may be a part of a sensing operation for the assistance device to select resource(s) for performing transmission. For example, the channel measurement operation performed by the assistance device may be the part of a channel state measurement operation during the sensing operation according to the embodiment of FIG. 14. In addition, for example, the assistance device may transmit channel state information measured through a part of the sensing operation to the transmitting UE.

For example, in NR V2X, various numerology (i.e., sub-carrier spacing) may be supported, and resource pool(s), carrier(s), and/or BWP(s) may be defined according to the numerology. In this case, in order for the transmitting UE to switch between carriers and/or BWPs for transmission according to the channel state of the carriers and/or the BWPs, the assisting device may transmit channel state information measured for each of the carriers and/or each of the BWPs to the transmitting UE.

According to an embodiment of the present disclosure, the assistance information may include time/frequency information related to a set of specific resource(s) or specific resource(s).

For example, the assisting device may independently perform a resource selection operation. For example, the assisting device may perform a resource monitoring process to help other UEs select resource(s). In this case, for example, the assisting device may determine/decide good resource(s), and the assisting device may transmit at least one of information related to a set of good resource(s), information related to time/frequency of good resource(s), and/or an index of good resource(s) (e.g., sub-channel index) to the transmitting UE. For example, the assisting device may determine/decide bad resource(s), and the assisting device may transmit at least one of information related to a set of bad resource(s), information related to time/frequency of bad resource(s), and/or an index of bad resource(s) (e.g., sub-channel index) to the transmitting UE.

Here, for example, the good resource(s) may be resource(s) with low interference. For example, the good resource(s) may be resource(s) that the assisting device intends to use for its own transmission. For example, the good resource(s) may be remaining resources excluding the resource(s) selected by the assisting device for its own transmission. For example, the bad resource(s) may be resource(s) with high interference. For example, the bad resource(s) may be resource(s) that the assisting device intends to use for its own transmission. For example, the bad resource(s) may be remaining resources excluding the resource(s) selected by the assisting device for its own transmission.

For example, the assisting device may transmit information for limiting a specific region in transmission resource pool(s) to the transmitting UE. For example, the assisting device may transmit information for allowing use of a specific region in transmission resource pool(s) to the transmitting UE. For example, the specific region may include specific time resource(s) and/or specific frequency resource(s). For example, the transmission resource pool(s) may be configured by the base station or may be configured in advance. For example, the transmission resource pool(s) may be defined in advance in the system.

For example, the assisting device may transmit information related to resource(s) that is/are highly likely to be used for transmission by the assisting device, to one or more UEs. Through this, the assisting device can prevent, as much as possible, the one or more UEs from using the resource(s) that is/are highly likely to be used for transmission by the assisting device. For example, the one or more UE may perform SL transmission by using resource(s) other than the resource(s) that is/are highly likely to be used for transmission by the assisting device. Alternatively, the assisting device can recommend that the one or more UEs use resource(s) as much as possible that is/are unlikely to be used for transmission by the assisting device. For example, the one or more UEs may perform SL transmission by using resource(s) that is/are unlikely to be used for transmission by the assisting device.

For example, in case the assisting device is a group header that manages the assistance information related to resource allocation in a group, the assisting device may transmit information related to resource(s) that is/are highly likely to be used for transmission by other UEs in the group, to the transmitting UE. Through this, the assisting device can prevent, as much as possible, the transmitting UE from using the resource(s) that is/are highly likely to be used for transmission by other UEs in the group. For example, in case the assisting device is a group header that manages the assistance information related to resource allocation in a group, the assisting device may transmit information related to resource(s) that is/are unlikely to be used for transmission by other UEs in the group, to the transmitting UE. Through this, the assisting device. Through this, the assisting device can recommend that the transmitting UE uses the resource(s) as much as possible that is/are unlikely to be used for transmission by other UEs in the group.

For example, in case the assisting device is the receiving UE, i.e., in case the receiving UE transmits the assistance information to the transmitting UE, the receiving UE may transmit information related to resource(s) (e.g., location information of resource(s)) in which the receiving UE is highly likely to use for transmission/reception with other UEs, to the transmitting UE. Through this, the assisting device can prevent, as much as possible, the transmitting UE from using the resource(s) for transmission. For example, in case the assisting device is the receiving UE, i.e., in case the receiving UE transmits the assistance information to the transmitting UE, the receiving UE may transmit information related to resource(s) (e.g., location information of resource(s)) in which the receiving UE is unlikely to use for transmission/reception with other UEs, to the transmitting UE. Through this, the assisting device can recommend that the transmitting UE uses the resource(s) for transmission as much as possible.

For example, the information related to resource(s) transmitted by the assisting device may be a unit of pre-configured sub-channel. For example, the information related to resource(s) transmitted by the assisting may be a unit of pre-configured frequency. For example, sub-channel information between UEs may be signaled as parameters in advance. For example, information related to resource(s) transmitted by the assisting device may be in a unit of slot. For example, information related to resource(s) transmitted by the assisting device may be a unit of time. For example, information related to resource(s) transmitted by the assisting device may be a combination of a unit of sub-channel and/or a unit of slot.

According to an embodiment of the present disclosure, the assistance information may include information related to resource allocation received from the base station.

For example, it is assumed that the assisting device is selected from among UE(s) capable of maintaining a connection with the base station. In this case, the assisting device may transmit information related to SL resource selection and/or system information received from the base station, to out-coverage UE(s). For example, in-coverage UE(s) may be UE(s) located within a coverage of the base station, and out-coverage UE(s) may be UE(s) located outside a coverage of the base station. For example, information related to SL resource selection may include information related to resource pool(s) required to support a specific service and/or channel state information of transmission resource pool(s) measured by the base station.

For example, the base station may transmit information related to resource(s), information related to resource pool(s), and/or information related to specific time/frequency resource(s) which should be used by a specific groupcast group far from the base station (e.g., a group that exists outside the coverage of the base station and cannot receive scheduling from the base station), to the assisting device, based on the channel environment and/or congestion level of each resource reported by UEs or measured by the base station. Alternatively, for example, the base station may update information related to resource(s) changed from the predefined resource information to the assisting device. In addition, for example, in case of V2X service(s) that requires high priority and/or high reliability, it is necessary to keep an interference of resource(s) on which the service is transmitted low. For this, the base station may define/configure specific time/frequency resource(s) to protect the corresponding service(s), and may transmit information related to specific time/frequency resource(s) to the assisting device.

For example, in order to increase the efficiency of using time/frequency resources overlapping between different resource pools, the base station may handle the overlapped resources. For example, the overlapped resources need to be used preferentially for group communication with a high priority or transmission of a service with a high priority. For example, the base station may inform the assisting device through system information so that the overlapped resources may be preferentially used for group communication with a high priority or transmission of a service with a high priority.

Hereinafter, a method for the assisting device to transmit the assistance information and a method for UE(s) to use the received assistance information according to various embodiments of the present disclosure will be described in detail.

For example, the assisting device may transmit the assistance information to UE(s) intactly.

For example, the assisting device may convert the assistance information, and the assisting device may transmit the converted assistance information to UE(s). For example, the assisting device may convert the assistance information into a number. For example, the assisting device may digitize a preferred/non-preferred level for each resource based on the assistance information, and may transmit the digitized preferred/non-preferred level.

Figure 18:
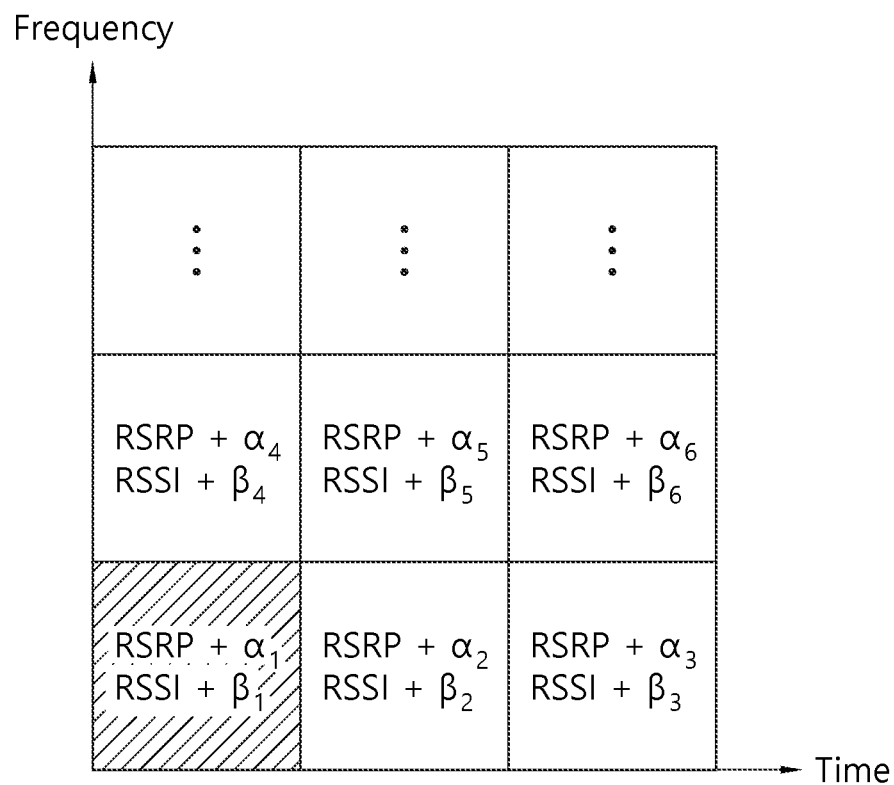
FIG. 18 shows a method for the assisting device to digitize and transmit the preferred/non-preferred level for each resource, in accordance with an embodiment of the present disclosure.

FIG. 18 shows a method for the assisting device to digitize and transmit the preferred/non-preferred level for each resource, in accordance with an embodiment of the present disclosure.

Referring to FIG. 18, a plurality of transmission resource pools may be configured. Here, for example, $\alpha$ and $\beta$ may be the assistance information transmitted by the assisting device. For example, each $\alpha$ and $\beta$ may be information obtained by digitizing the preferred/non-preferred level for each resource (e.g., for each sub-channel) by the assisting device so that the transmitting UE can use the assistance information for resource selection. More specifically, in a resource selection procedure, $\alpha$ may be a numeric metric so that the transmitting UE can use the numeric metric in a resource sensing procedure using RSRP, and $\beta$ may be a numeric metric so that the transmitting UE can use the numeric metric in a resource sensing procedure using RSSI. For example, $\beta$ may be information obtained by digitizing the interference signal level for each sub-channel.

In this case, the transmitting UE may perform resource selection by using the assistance information received from the assisting device. For example, the transmitting UE may perform resource selection by adding the corresponding digitized assistance information to RSRP or RSSI measured by the transmitting UE in the resource selection procedure.

For example, if the assisting device transmits $\alpha$ and $\beta$ to express the non-preferred level in the shaded area of FIG. 18, the transmitting UE may be configured to exclude resource(s) based on a result of adding $\alpha$ and $\beta$ to the RSRP and RSSI measured by the transmitting UE, respectively. For example, if a result of adding $\alpha$ and $\beta$ to RSRP and RSSI measured by the transmitting UE, respectively, exceeds a pre-determined threshold value, the transmitting UE may exclude the corresponding resource(s) from candidate transmission resource(s).

For example, the embodiment of FIG. 18 shows a form in which digitized assistance information is added to RSRP and RSSI measured for each sub-channel by the transmitting UE. However, assistance information transmitted by the assisting device may be information representing an offset for adjusting, by the transmitting UE, a threshold value in a procedure for comparing a state of resource(s) with a specific threshold value in a resource selection procedure. For example, in a procedure for determining/deciding, by the transmitting UE, whether or not to exclude resource(s) by comparing RSRP and/or RSSI of the sub-channel with a specific threshold value, the assistance information transmitted by the assisting device may be information related to an offset for adjusting a specific threshold value. That is, in case the assisting device measures the non-preferred level for a specific sub-channel and transmits the non-preferred level to the transmitting UE, the transmitting UE may adjust a threshold value by reflecting offset information received from the assisting device to the threshold value, and the transmitting UE may determine whether or not to exclude the specific sub-channel based on the adjusted threshold value, in a procedure for comparing channel state information of the specific sub-channel with the threshold value by the transmitting UE.

The embodiment of FIG. 18 is only an example of information related to a channel state among assistance information transmitted by the assisting device. For example, the assisting device may digitize and transmit a preferred/non-preferred level for other assistance information. For example, the assisting device may digitize and transmit time/frequency information related to a specific resource set or specific resource(s) and/or information related to resource allocation received from the base station. Therefore, the transmitting UE may determine whether or not to exclude specific resource(s) (e.g., sub-channel(s)) in a resource selection procedure of the transmitting UE, based on the corresponding digitized assistance information.

According to an embodiment of the present disclosure, a range of numbers that can be transmitted by the assisting device may be different according to a type of the assisting device. For example, in case the assisting device is a normal UE, it may not be allowed for the assisting device to transmit a number within a range representing extreme preference/non-preference. On the other hand, for example, in case the assisting device is the RSU and/or the base station having scheduling authority, etc., it may be allowed for the assisting device to transmit a number within a range representing extreme preference/non-preference.

For example, if a digitized preferred/non-preferred value for each resource is added to RSRP and/or RSSI, and if the transmitting UE excludes resource(s) with RSRP and/or RSSI greater than or equal to a certain threshold value, a range of numbers related to preference/non-preference of resource(s) that can be expressed by the normal UE may be [−10, +10], and a range of numbers related to preference/non-preference of resource(s) that can be expressed by the RSU may be [−100, +100]. For example, if the RSU configures the transmitting UE to necessarily use a specific resource, the RSU may transmit a very low number (e.g., −100) to the transmitting UE, and the transmitting UE that has received the number related to the extreme preference may perform SL communication by necessarily using the specific resource. For example, if the RSU prevents the transmitting UE from using a specific resource, the RSU may transmit a very high number (e.g., +100) to the transmitting UE, and the transmitting UE that has received the number related to the extreme non-preference may be configured not to use the specific resource. For example, the base station may configure whether or not to signal the above-described range of preferred/non-preferred numbers and preferred/non-preferred resource information. Through this, the base station can control whether a specific UE is involved in resource selection of other UEs and the level of involvement.

For example, the transmitting UE may process the assistance information received from the assisting device as in the above embodiment, and the transmitting UE may also apply a different offset to the assistance information received from the assisting device autonomously according to QoS-related information (e.g., delay, reliability, priority) of service(s) to be transmitted by the transmitting UE. For example, in case a service to be transmitted by the transmitting UE is a high-priority service, even if the transmitting UE receives information indicating non-preference of a resource to be used for transmitting the service from the assisting device, the transmitting UE may perform a resource selection procedure by applying an offset so as not to exclude the resource.

Figure 19:
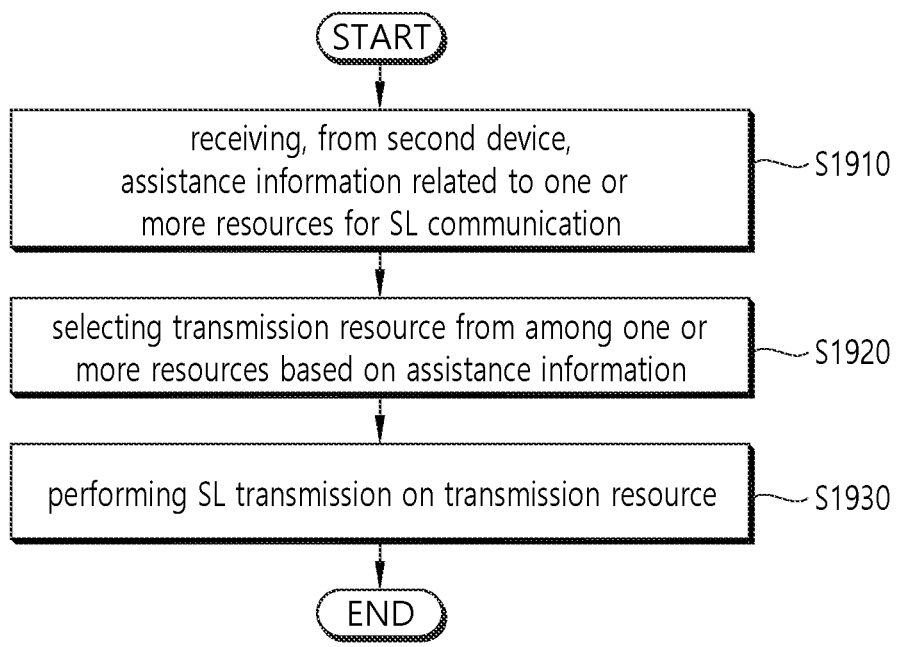
FIG. 19 shows a method for performing, by a first device (100), SL transmission, in accordance with an embodiment of the present disclosure.

FIG. 19 shows a method for performing, by a first device (100), SL transmission, in accordance with an embodiment of the present disclosure. The embodiment of FIG. 19 may be combined with various embodiments of the present disclosure.

Referring to FIG. 19, in step S1910, the first device (100) may receive, from a second device (200), assistance information related to one or more resources for SL communication.

In step S1920, the first device (100) may select a transmission resource from among the one or more resources based on the assistance information.

In step S1930, the first device (100) may perform the SL transmission on the transmission resource.

For example, the assistance information may include channel state information for the one or more resources measured by the second device (200). Additionally, for example, the first device (100) may measure a channel state for the one or more resources. Additionally, for example, the first device (100) may adjust channel state information for the one or more resources measured by the first device (100) based on the assistance information. For example, the transmission resource may be selected based on the adjusted channel state information for the one or more resources.

For example, the assistance information may include information on one or more resources with low interference determined by the second device (200). For example, the transmission resource may be selected from among the one or more resources with low interference.

For example, the assistance information may include information on one or more resources with high interference determined by the second device (200). For example, the transmission resource may be selected from among resources other than the one or more resources with high interference.

For example, the assistance information may include information on one or more resources, determined by the second device (200), to be used by the second device (200) or other devices. For example, the transmission resource may be selected from among resources other than the one or more resources determined to be used by the second device (200) or other devices.

For example, the assistance information may include information on one or more resources related to a specific service. For example, the specific service may include at least one of a service related to a high priority, a service related to a high reliability, or a service related to a low delay. For example, the transmission resource may be selected from among resources other than the one or more resources related to the specific service.

The above-described proposed method may be performed by a device according to various embodiments of the present disclosure. First, processor(s) (102) of the first device (100) may control transceiver(s) (106) to receive, from the second device (200), assistance information related to one or more resources for SL communication. In addition, processor(s) (102) of the first device (100) may select a transmission resource from among the one or more resources based on the assistance information. In addition, processor(s) (102) of the first device (100) may control transceiver(s) (106) to perform the SL transmission on the transmission resource.

Figure 20:
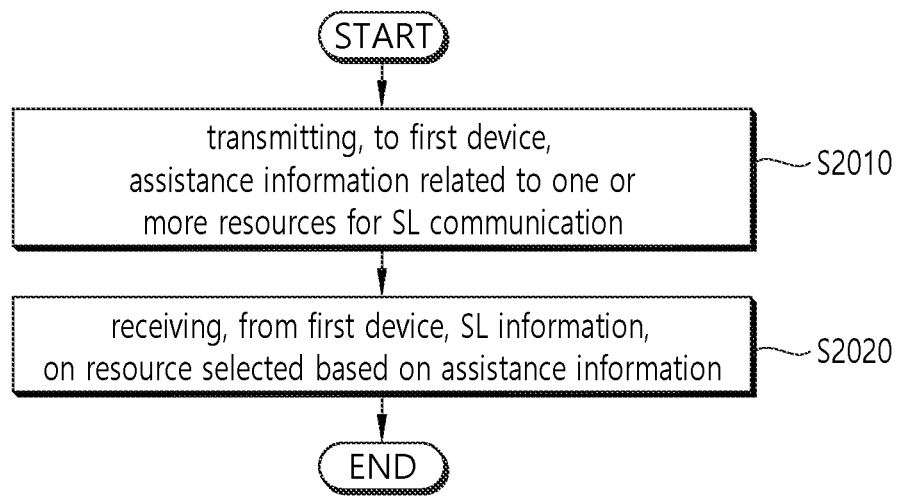
FIG. 20 shows a method for receiving, by a second device (200), sidelink (SL) information, in accordance with an embodiment of the present disclosure.

FIG. 20 shows a method for receiving, by a second device (200), sidelink (SL) information, in accordance with an embodiment of the present disclosure. The embodiment of FIG. 20 may be combined with various embodiments of the present disclosure.

Referring to FIG. 20, in step S2010, the second device (200) may transmit, to a first device (100), assistance information related to one or more resources for SL communication.

In step S2020, the second device (200) may receive, from the first device (100), the SL information, on a resource selected based on the assistance information.

The above-described proposed method may be performed by a device according to various embodiments of the present disclosure. First, processor(s) (202) of the second device (200) may control transceiver(s) (206) to transmit, to a first device (100), assistance information related to one or more resources for SL communication. In addition, processor(s) (202) of the second device (200) may control transceiver(s) (206) to receive, from the first device (100), the SL information, on a resource selected based on the assistance information.

The various embodiments of the present disclosure may be independently implemented. Alternatively, the various embodiments of the present disclosure may be implemented by being inter-combined or integrated. For example, although the various embodiments of the present disclosure are described based on a 3GPP system for simplicity in the description, the various embodiments of the present disclosure may also be extendedly applied to other system apart from the 3GPP system. For example, the various embodiments of the present disclosure will not be restricted only to direct communication between UEs and may also be used in uplink or downlink. At this point, a base station or relay node, and so on, may use the proposed methods according to the various embodiments of the present disclosure. For example, among the various embodiments of the present disclosure, some of the embodiments may be limitedly applied only to resource allocation mode 1. For example, among the various embodiments of the present disclosure, some of the embodiments may be limitedly applied only to resource allocation mode 2. For example, among the various embodiments of the present disclosure, some of the embodiments may be limitedly applied only to pre-configured/signaled (specific) V2X channel/signal transmission (e.g., PSCCH and/or (associated) PSCCH and/or PSBCH). For example, among the various embodiments of the present disclosure, some of the embodiments may be limitedly applied only to a case where a PSSCH and (associated) PSCCH are transmitted while being adjacent to one another (within a frequency domain). For example, among the various embodiments of the present disclosure, some of the embodiments may be limitedly applied only to a case where a PSSCH and (associated) PSCCH are transmitted while being non-adjacent to one another (within a frequency domain). For example, among the various embodiments of the present disclosure, some of the embodiments may be limitedly applied only to a case where pre-configured/signaled MCS and/or coding rate and/or RB value/range-based transmission is performed. For example, among the various embodiments of the present disclosure, some of the embodiments may be limitedly applied only to a case where positions and/or number synchronization signal (transmission and/or reception) resources (and/or number and/or positions of V2X resource pool-related subframes (and/or size and/or number of subchannels)) among the carriers are equal (and/or (partly) different). For example, the proposed methods of the present disclosure may be extendedly applied to (V2X) communication between the base station and the UEs. For example, among the various embodiments of the present disclosure, some of the embodiments may be limitedly applied only to at least one of unicast (sidelink) communication, groupcast (sidelink) communication and/or broadcast (sidelink) communication.

Hereinafter, an apparatus to which various embodiments of the present disclosure can be applied will be described.

The various descriptions, functions, procedures, proposals, methods, and/or operational flowcharts of the present disclosure described in this document may be applied to, without being limited to, various fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 21:
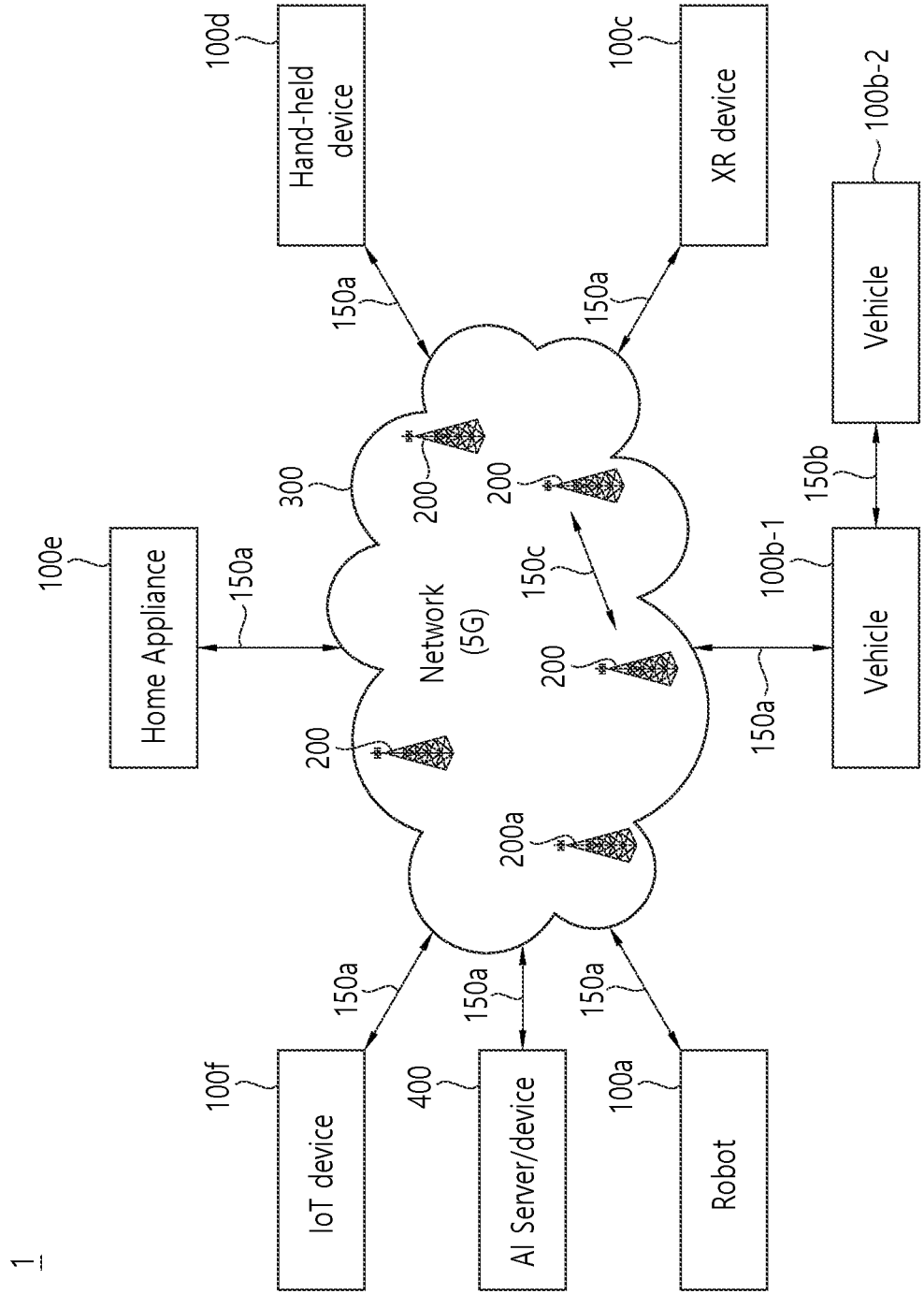
FIG. 21 shows a communication system (1), in accordance with an embodiment of the present disclosure.

FIG. 21 shows a communication system (1), in accordance with an embodiment of the present disclosure.

Referring to FIG. 21, a communication system (1) to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot (100a), vehicles (100b-1, 100b-2), an eXtended Reality (XR) device (100c), a hand-held device (100d), a home appliance (100e), an Internet of Things (IoT) device (100f), and an Artificial Intelligence (AI) device/server (400). For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device (200a) may operate as a BS/network node with respect to other wireless devices.

The wireless devices (100a~100f) may be connected to the network (300) via the BSs (200). An AI technology may be applied to the wireless devices (100a~100f) and the wireless devices (100a~100f) may be connected to the AI server (400) via the network (300). The network (300) may be configured using a 3G network, a 4G (e.g., LTE) network, or a 5G (e.g., NR) network. Although the wireless devices (100a~100f) may communicate with each other through the BSs (200)/network (300), the wireless devices (100a~100f) may perform direct communication (e.g., sidelink communication) with each other without passing through the BSs/network. For example, the vehicles (100b-1, 100b-2) may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices (100a~100f).

Wireless communication/connections (150a, 150b, 150c) may be established between the wireless devices (100a~100f)/BS (200), or BS (200)/BS (200). Herein, the wireless communication/connections may be established through various RATs (e.g., 5G NR) such as uplink/downlink communication (150a), sidelink communication (150b) (or, D2D communication), or inter BS communication (e.g. relay, Integrated Access Backhaul (IAB)). The wireless devices and the BSs/the wireless devices may transmit/receive radio signals to/from each other through the wireless communication/connections (150a, 150b). For example, the wireless communication/connections (150a, 150b) may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 22:
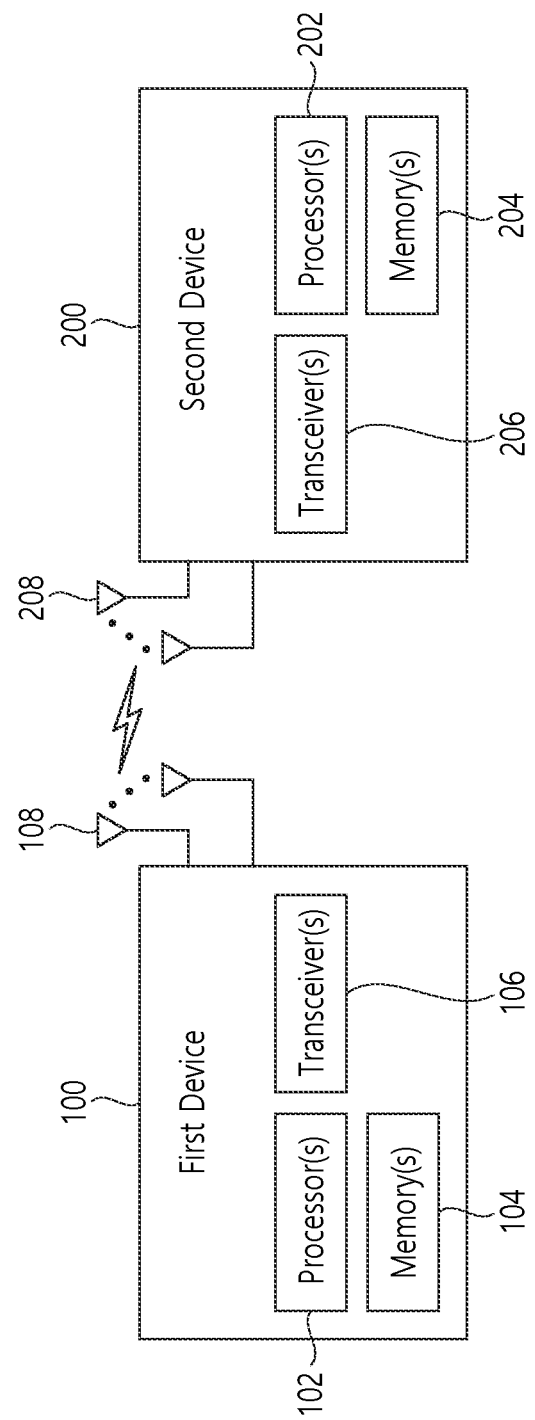
FIG. 22 shows wireless devices, in accordance with an embodiment of the present disclosure.

FIG. 22 shows wireless devices, in accordance with an embodiment of the present disclosure.

Referring to FIG. 22, a first wireless device (100) and a second wireless device (200) may transmit radio signals through various RATs (e.g., LTE and NR). Herein, {the first wireless device (100) and the second wireless device (200)} may correspond to {the wireless device (100x) and the BS (200)} and/or {the wireless device (100x) and the wireless device (100x)} of FIG. 21.

The first wireless device (100) may include one or more processors (102) and one or more memories (104) and additionally further include one or more transceivers (106) and/or one or more antennas (108). The processor(s) (102) may control the memory(s) (104) and/or the transceiver(s) (106) and may be configured to implement the descriptions, functions, procedures, proposals, methods, and/or operational flowcharts disclosed in this document. For example, the processor(s) (102) may process information within the memory(s) (104) to generate first information/signals and then transmit radio signals including the first information/signals through the transceiver(s) (106). The processor(s) (102) may receive radio signals including second information/signals through the transceiver (106) and then store information obtained by processing the second information/signals in the memory(s) (104). The memory(s) (104) may be connected to the processor(s) (102) and may store various information related to operations of the processor(s) (102). For example, the memory(s) (104) may store software code including commands for performing a part or the entirety of processes controlled by the processor(s) (102) or for performing the descriptions, functions, procedures, proposals, methods, and/or operational flowcharts disclosed in this document. Herein, the processor(s) (102) and the memory(s) (104) may be a part of a communication modem/circuit/chip designed to implement RAT (e.g., LTE or NR). The transceiver(s) (106) may be connected to the processor(s) (102)

and transmit and/or receive radio signals through one or more antennas (108). Each of the transceiver(s) (106) may include a transmitter and/or a receiver. The transceiver(s) (106) may be interchangeably used with Radio Frequency (RF) unit(s). In the present disclosure, the wireless device may represent a communication modem/circuit/chip.

The second wireless device (200) may include one or more processors (202) and one or more memories (204) and additionally further include one or more transceivers (206) and/or one or more antennas (208). The processor(s) (202) may control the memory(s) (204) and/or the transceiver(s) (206) and may be configured to implement the descriptions, functions, procedures, proposals, methods, and/or operational flowcharts disclosed in this document. For example, the processor(s) (202) may process information within the memory(s) (204) to generate third information/signals and then transmit radio signals including the third information/signals through the transceiver(s) (206). The processor(s) (202) may receive radio signals including fourth information/signals through the transceiver(s) (106) and then store information obtained by processing the fourth information/signals in the memory(s) (204). The memory(s) (204) may be connected to the processor(s) (202) and may store various information related to operations of the processor(s) (202). For example, the memory(s) (204) may store software code including commands for performing a part or the entirety of processes controlled by the processor(s) (202) or for performing the descriptions, functions, procedures, proposals, methods, and/or operational flowcharts disclosed in this document. Herein, the processor(s) (202) and the memory(s) (204) may be a part of a communication modem/circuit/chip designed to implement RAT (e.g., LTE or NR). The transceiver(s) (206) may be connected to the processor(s) (202) and transmit and/or receive radio signals through one or more antennas (208). Each of the transceiver(s) (206) may include a transmitter and/or a receiver. The transceiver(s) (206) may be interchangeably used with RF unit(s). In the present disclosure, the wireless device may represent a communication modem/circuit/chip.

Hereinafter, hardware elements of the wireless devices (100, 200) will be described more specifically. One or more protocol layers may be implemented by, without being limited to, one or more processors (102, 202). For example, the one or more processors (102, 202) may implement one or more layers (e.g., functional layers such as PHY, MAC, RLC, PDCP, RRC, and SDAP). The one or more processors (102, 202) may generate one or more Protocol Data Units (PDUs) and/or one or more Service Data Unit (SDUs) according to the descriptions, functions, procedures, proposals, methods, and/or operational flowcharts disclosed in this document. The one or more processors (102, 202) may generate messages, control information, data, or information according to the descriptions, functions, procedures, proposals, methods, and/or operational flowcharts disclosed in this document. The one or more processors (102, 202) may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers (106, 206). The one or more processors (102, 202) may receive the signals (e.g., baseband signals) from the one or more transceivers (106, 206) and acquire the PDUs, SDUs, messages, control information, data, or information according to the descriptions, functions, procedures, proposals, methods, and/or operational flowcharts disclosed in this document.

The one or more processors (102, 202) may be referred to as controllers, microcontrollers, microprocessors, or microcomputers. The one or more processors (102, 202) may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors (102, 202). The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors (102, 202) or stored in the one or more memories (104, 204) so as to be driven by the one or more processors (102, 202). The descriptions, functions, procedures, proposals, methods, and/or operational flowcharts disclosed in this document may be implemented using firmware or software in the form of code, commands, and/or a set of commands.

The one or more memories (104, 204) may be connected to the one or more processors (102, 202) and store various types of data, signals, messages, information, programs, code, instructions, and/or commands. The one or more memories (104, 204) may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories (104, 204) may be located at the interior and/or exterior of the one or more processors (102, 202). The one or more memories (104, 204) may be connected to the one or more processors (102, 202) through various technologies such as wired or wireless connection.

The one or more transceivers (106, 206) may transmit user data, control information, and/or radio signals/channels, mentioned in the methods and/or operational flowcharts of this document, to one or more other devices. The one or more transceivers (106, 206) may receive user data, control information, and/or radio signals/channels, mentioned in the descriptions, functions, procedures, proposals, methods, and/or operational flowcharts disclosed in this document, from one or more other devices. For example, the one or more transceivers (106, 206) may be connected to the one or more processors (102, 202) and transmit and receive radio signals. For example, the one or more processors (102, 202) may perform control so that the one or more transceivers (106, 206) may transmit user data, control information, or radio signals to one or more other devices. The one or more processors (102, 202) may perform control so that the one or more transceivers (106, 206) may receive user data, control information, or radio signals from one or more other devices. The one or more transceivers (106, 206) may be connected to the one or more antennas (108, 208) and the one or more transceivers (106, 206) may be configured to transmit and receive user data, control information, and/or radio signals/channels, mentioned in the descriptions, functions, procedures, proposals, methods, and/or operational flowcharts disclosed in this document, through the one or more antennas (108, 208). In this document, the one or more antennas may be a plurality of physical antennas or a plurality of logical antennas (e.g., antenna ports). The one or more transceivers (106, 206) may convert received radio signals/channels, etc., from RF band signals into baseband signals in order to process received user data, control information, radio signals/channels, etc., using the one or more processors (102, 202). The one or more transceivers (106, 206) may convert the user data, control information, radio signals/channels, etc., processed using the one or more processors (102, 202) from the base band signals into the RF band signals. To this end, the one or more transceivers (106, 206) may include (analog) oscillators and/or filters.

Figure 23:
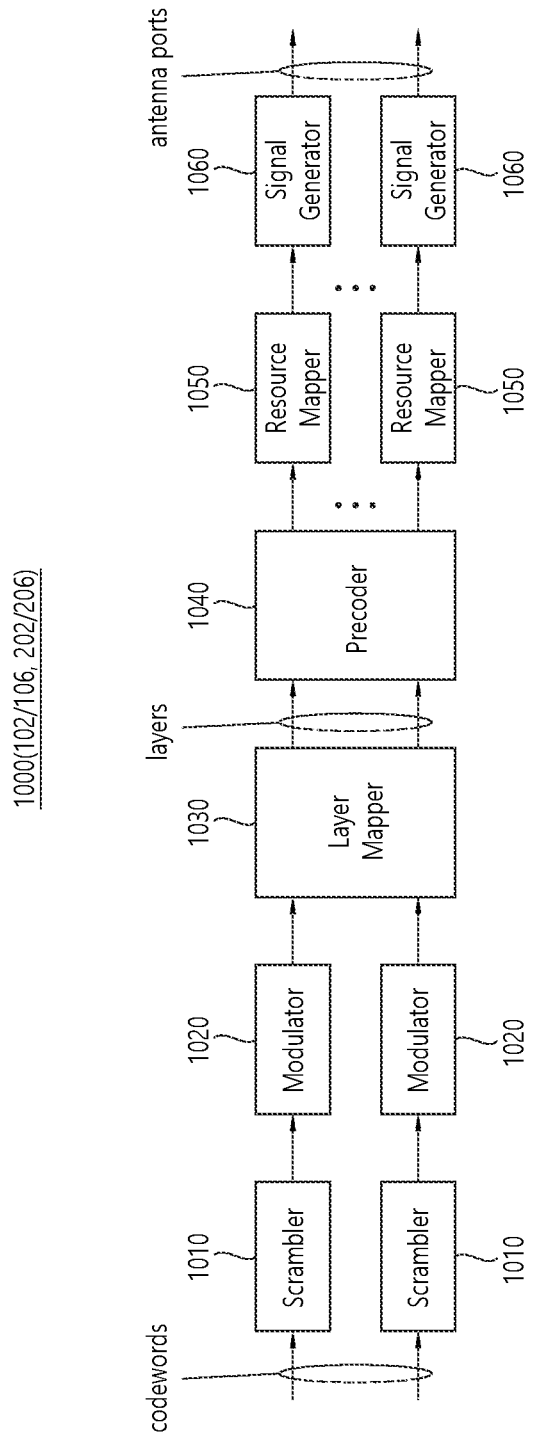
FIG. 23 shows a signal process circuit for a transmission signal, in accordance with an embodiment of the present disclosure.

FIG. 23 shows a signal process circuit for a transmission signal, in accordance with an embodiment of the present disclosure.

Referring to FIG. 23, a signal processing circuit (1000) may include scramblers (1010), modulators (1020), a layer mapper (1030), a precoder (1040), resource mappers (1050), and signal generators (1060). An operation/function of FIG. 23 may be performed, without being limited to, the processors (102, 202) and/or the transceivers (106, 206) of FIG. 22. Hardware elements of FIG. 23 may be implemented by the processors (102, 202) and/or the transceivers (106, 206) of FIG. 22. For example, blocks 1010~1060 may be implemented by the processors (102, 202) of FIG. 22. Alternatively, the blocks 1010~1050 may be implemented by the processors (102, 202) of FIG. 22 and the block 1060 may be implemented by the transceivers (106, 206) of FIG. 22.

Codewords may be converted into radio signals via the signal processing circuit (1000) of FIG. 23. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers (1010). Scramble sequences used for scrambling may be generated based on an initialization value, and the initialization value may include ID information of a wireless device. The scrambled bit sequences may be modulated to modulation symbol sequences by the modulators (1020). A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper (1030). Modulation symbols of each transport layer may be mapped (precoded) to corresponding antenna port(s) by the precoder (1040). Outputs z of the precoder (1040) may be obtained by multiplying outputs y of the layer mapper (1030) by an N*M precoding matrix W. Herein, N is the number of antenna ports and M is the number of transport layers. The precoder (1040) may perform precoding after performing transform precoding (e.g., DFT) for complex modulation symbols. Alternatively, the precoder (1040) may perform precoding without performing transform precoding.

The resource mappers (1050) may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators (1060) may generate radio signals from the mapped modulation symbols and the generated radio signals may be transmitted to other devices through each antenna. For this purpose, the signal generators (1060) may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures (1010~1060) of FIG. 23. For example, the wireless devices (e.g., 100, 200 of FIG. 22) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 24:
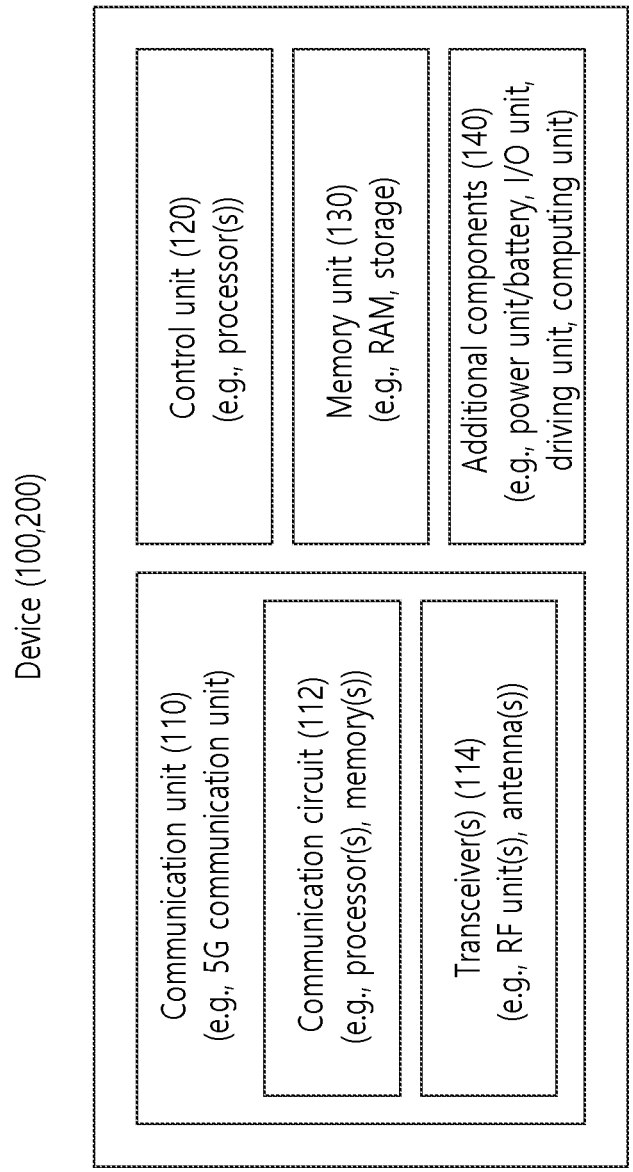
FIG. 24 shows another example of a wireless device, in accordance with an embodiment of the present disclosure.

FIG. 24 shows another example of a wireless device, in accordance with an embodiment of the present disclosure. The wireless device may be implemented in various forms according to a use-case/service (refer to FIG. 21).

Referring to FIG. 24, wireless devices (100, 200) may correspond to the wireless devices (100, 200) of FIG. 22 and may be configured by various elements, components, units/portions, and/or modules. For example, each of the wireless devices (100, 200) may include a communication unit (110), a control unit (120), a memory unit (130), and additional components (140). The communication unit may include a communication circuit (112) and transceiver(s) (114). For example, the communication circuit (112) may include the one or more processors (102, 202) and/or the one or more memories (104, 204) of FIG. 22. For example, the transceiver(s) (114) may include the one or more transceivers (106, 206) and/or the one or more antennas (108, 208) of FIG. 22. The control unit (120) is electrically connected to the communication unit (110), the memory (130), and the additional components (140) and controls overall operation of the wireless devices. For example, the control unit (120) may control an electric/mechanical operation of the wireless device based on programs/code/commands/information stored in the memory unit (130). The control unit (120) may transmit the information stored in the memory unit (130) to the exterior (e.g., other communication devices) via the communication unit (110) through a wireless/wired interface or store, in the memory unit (130), information received through the wireless/wired interface from the exterior (e.g., other communication devices) via the communication unit (110).

The additional components (140) may be variously configured according to types of wireless devices. For example, the additional components (140) may include at least one of a power unit/battery, input/output (I/O) unit, a driving unit, and a computing unit. The wireless device may be implemented in the form of, without being limited to, the robot (100a of FIG. 21), the vehicles (100b-1 and 100b-2 of FIG. 21), the XR device (100c of FIG. 21), the hand-held device (100d of FIG. 21), the home appliance (100e of FIG. 21), the IoT device (100f of FIG. 21), a digital broadcast terminal, a hologram device, a public safety device, an MTC device, a medicine device, a fintech device (or a finance device), a security device, a climate/environment device, the AI server/device (400 of FIG. 21), the BSs (200 of FIG. 21), a network node, etc. The wireless device may be used in a mobile or fixed place according to a use-example/service.

In FIG. 24, the entirety of the various elements, components, units/portions, and/or modules in the wireless devices (100, 200) may be connected to each other through a wired interface or at least a part thereof may be wirelessly connected through the communication unit (110). For example, in each of the wireless devices (100, 200), the control unit (120) and the communication unit (110) may be connected by wire and the control unit (120) and first units (e.g., 130, 140) may be wirelessly connected through the communication unit (110). Each element, component, unit/portion, and/or module within the wireless devices (100, 200) may further include one or more elements. For example, the control unit (120) may be configured by a set of one or more processors. As an example, the control unit (120) may be configured by a set of a communication control processor, an application processor, an Electronic Control Unit (ECU), a graphical processing unit, and a memory control processor. As another example, the memory (130) may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 24 will be described in detail with reference to the drawings.

Figure 25:
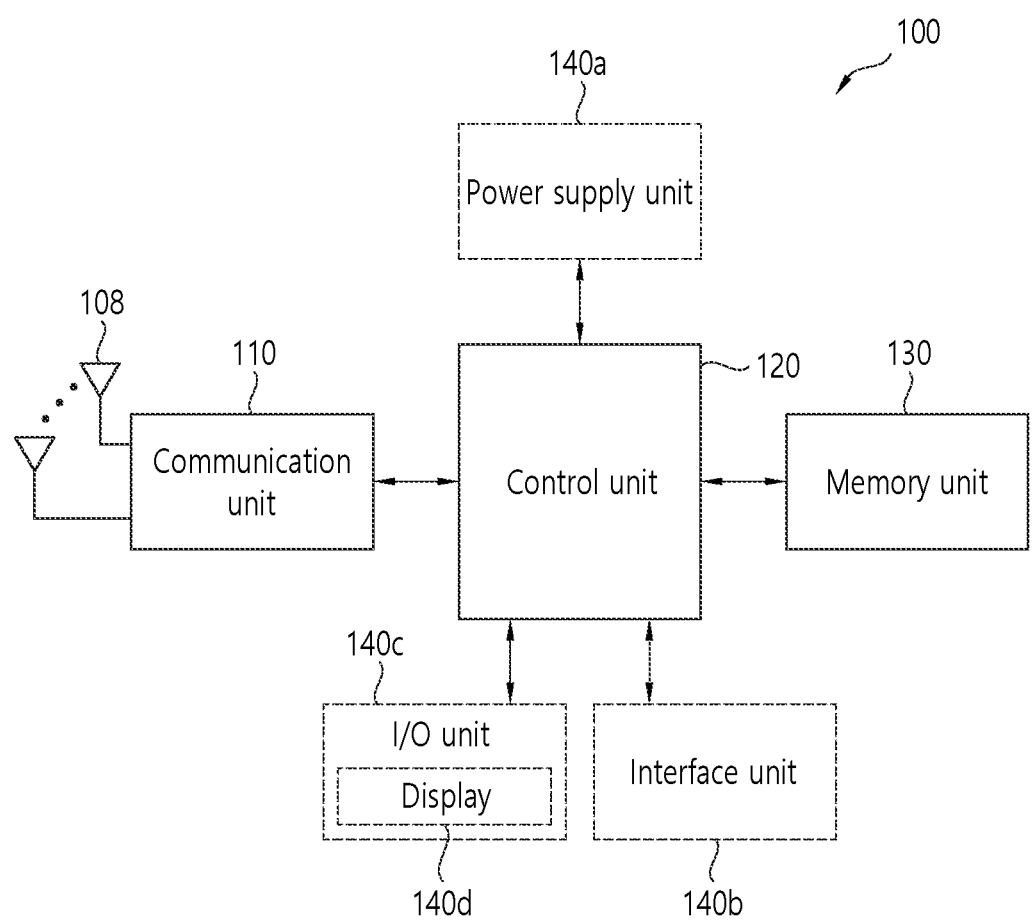
FIG. 25 shows a hand-held device, in accordance with an embodiment of the present disclosure.

FIG. 25 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 25, a hand-held device (100) may include an antenna unit (108), a communication unit (110), a control unit (120), a memory unit (130), a power supply unit (140a), an interface unit (140b), and an I/O unit (140c). The antenna unit (108) may be configured as a part of the communication unit (110). Blocks 110~130/140a~140c correspond to the blocks 110~130/140 of FIG. 24, respectively.

The communication unit (110) may transmit and receive signals (e.g., data and control signals) to and from other wireless devices or BSs. The control unit (120) may perform various operations by controlling constituent elements of the hand-held device (100). The control unit (120) may include an Application Processor (AP). The memory unit (130) may store data/parameters/programs/code/commands needed to drive the hand-held device (100). The memory unit (130) may store input/output data/information. The power supply unit (140a) may supply power to the hand-held device (100) and include a wired/wireless charging circuit, a battery, etc. The interface unit (140b) may support connection of the hand-held device (100) to other external devices. The interface unit (140b) may include various ports (e.g., an audio I/O port and a video I/O port) for connection with external devices. The I/O unit (140c) may input or output video information/signals, audio information/signals, data, and/or information input by a user. The I/O unit (140c) may include a camera, a microphone, a user input unit, a display unit (140d), a speaker, and/or a haptic module.

As an example, in the case of data communication, the I/O unit (140c) may acquire information/signals (e.g., touch, text, voice, images, or video) input by a user and the acquired information/signals may be stored in the memory unit (130). The communication unit (110) may convert the information/signals stored in the memory into radio signals and transmit the converted radio signals to other wireless devices directly or to a BS. The communication unit (110) may receive radio signals from other wireless devices or the BS and then restore the received radio signals into original information/signals. The restored information/signals may be stored in the memory unit (130) and may be output as various types (e.g., text, voice, images, video, or haptic) through the I/O unit (140c).

Figure 26:
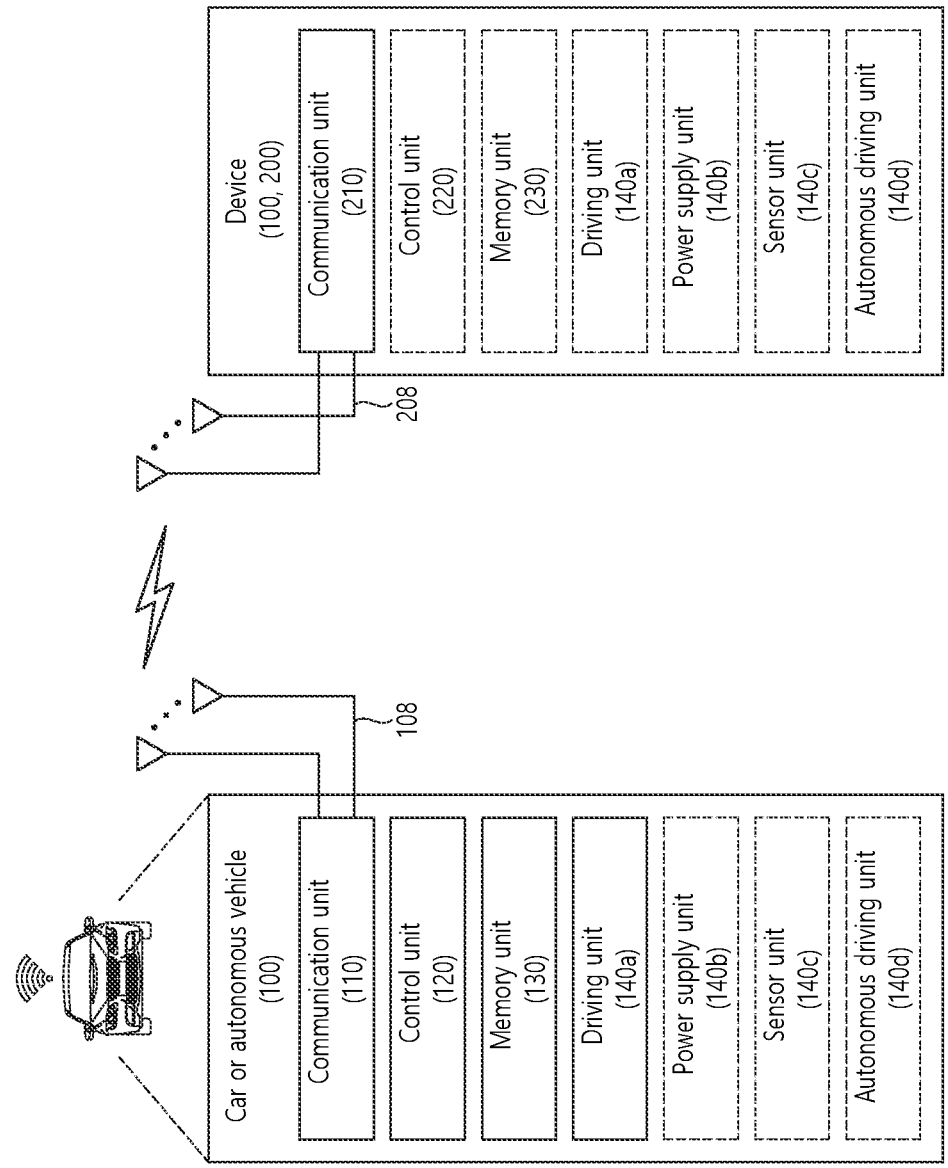
FIG. 26 shows a vehicle or an autonomous vehicle, in accordance with an embodiment of the present disclosure.

FIG. 26 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, etc.

Referring to FIG. 26, a vehicle or autonomous vehicle (100) may include an antenna unit (108), a communication unit (110), a control unit (120), a driving unit (140a), a power supply unit (140b), a sensor unit (140c), and an autonomous driving unit (140d). The antenna unit (108) may be configured as a part of the communication unit (110). The blocks 110/130/140a~140d correspond to the blocks 110/130/140 of FIG. 24, respectively.

The communication unit (110) may transmit and receive signals (e.g., data and control signals) to and from external devices such as other vehicles, BSs (e.g., gNBs and road side units), and servers. The control unit (120) may perform various operations by controlling elements of the vehicle or the autonomous vehicle (100). The control unit (120) may include an Electronic Control Unit (ECU). The driving unit (140a) may cause the vehicle or the autonomous vehicle (100) to drive on a road. The driving unit (140a) may include an engine, a motor, a powertrain, a wheel, a brake, a steering device, etc. The power supply unit (140b) may supply power to the vehicle or the autonomous vehicle (100) and include a wired/wireless charging circuit, a battery, etc. The sensor unit (140c) may acquire a vehicle state, ambient environment information, user information, etc. The sensor unit (140c) may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit (140d) may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit (110) may receive map data, traffic information data, etc., from an external server. The autonomous driving unit (140d) may generate an autonomous driving path and a driving plan from the obtained data. The control unit (120) may control the driving unit (140a) such that the vehicle or the autonomous vehicle (100) may move along the autonomous driving path according to the driving plan (e.g., speed/direction control). In the middle of autonomous driving, the communication unit (110) may aperiodically/periodically acquire recent traffic information data from the external server and acquire surrounding traffic information data from neighboring vehicles. In the middle of autonomous driving, the sensor unit (140c) may obtain a vehicle state and/or surrounding environment information. The autonomous driving unit (140d) may update the autonomous driving path and the driving plan based on the newly obtained data/information. The communication unit (110) may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Figure 27:
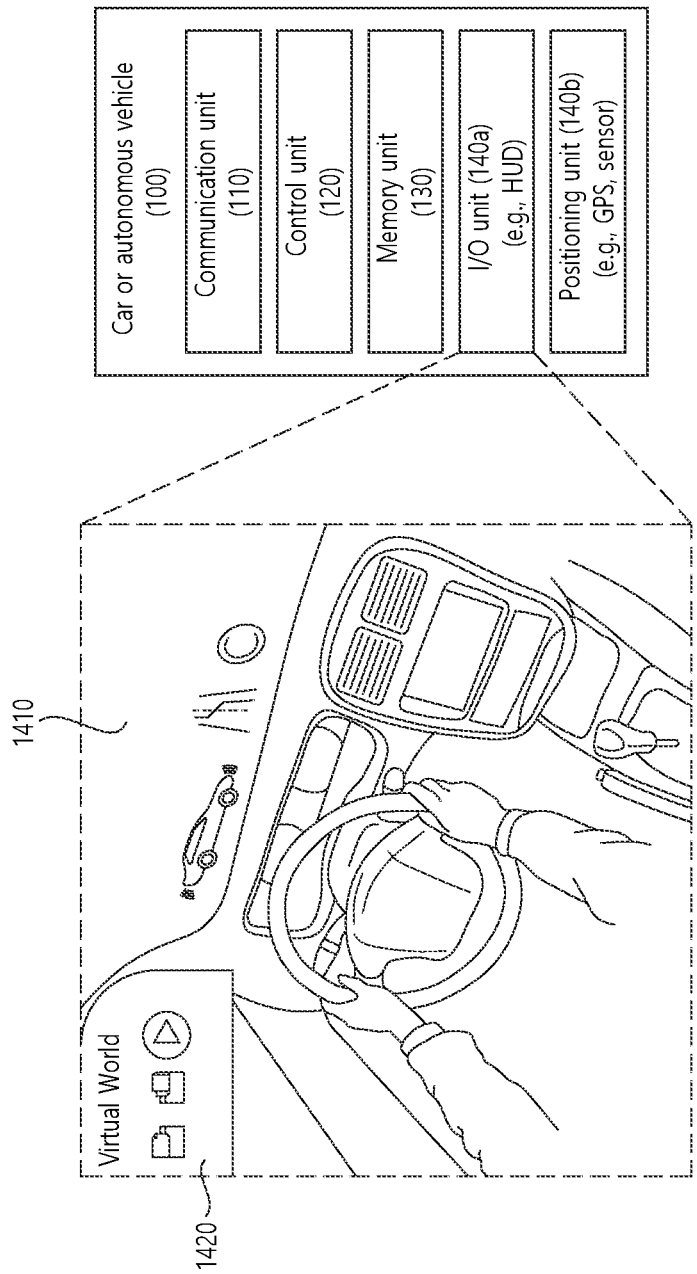
FIG. 27 shows a vehicle, in accordance with an embodiment of the present disclosure.

FIG. 27 shows a vehicle, in accordance with an embodiment of the present disclosure. The vehicle may be implemented as a transport means, an aerial vehicle, a ship, etc.

Referring to FIG. 27, a vehicle (100) may include a communication unit (110), a control unit (120), a memory unit (130), an I/O unit (140a), and a positioning unit (140b). Herein, the blocks 110~130/140a~140b correspond to blocks 110~130/140 of FIG. 24.

The communication unit (110) may transmit and receive signals (e.g., data and control signals) to and from external devices such as other vehicles or BSs. The control unit (120) may perform various operations by controlling constituent elements of the vehicle (100). The memory unit (130) may store data/parameters/programs/code/commands for supporting various functions of the vehicle (100). The I/O unit (140a) may output an AR/VR object based on information within the memory unit (130). The I/O unit (140a) may include an HUD. The positioning unit (140b) may acquire information about the position of the vehicle (100). The position information may include information about an absolute position of the vehicle (100), information about the position of the vehicle (100) within a traveling lane, acceleration information, and information about the position of the vehicle (100) from a neighboring vehicle. The positioning unit (140b) may include a GPS and various sensors.

As an example, the communication unit (110) of the vehicle (100) may receive map information and traffic information from an external server and store the received information in the memory unit (130). The positioning unit (140b) may obtain the vehicle position information through the GPS and various sensors and store the obtained information in the memory unit (130). The control unit (120) may generate a virtual object based on the map information, traffic information, and vehicle position information and the I/O unit (140a) may display the generated virtual object in a window in the vehicle (1410, 1420). The control unit (120) may determine whether the vehicle (100) normally drives within a traveling lane, based on the vehicle position information. If the vehicle (100) abnormally exits from the traveling lane, the control unit (120) may display a warning on the window in the vehicle through the I/O unit (140a). In addition, the control unit (120) may broadcast a warning message regarding driving abnormality to neighboring vehicles through the communication unit (110). According to situation, the control unit (120) may transmit the vehicle position information and the information about driving/vehicle abnormality to related organizations.

Figure 28:
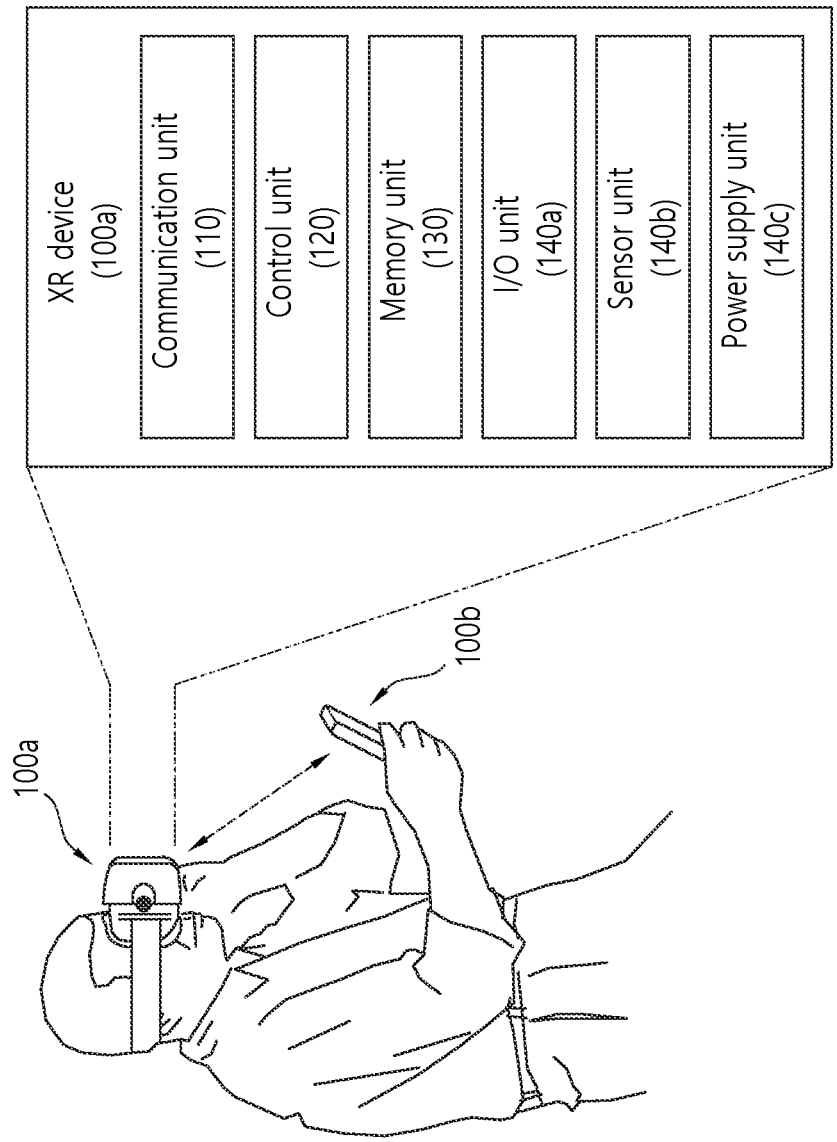
FIG. 28 shows an XR device, in accordance with an embodiment of the present disclosure.

FIG. 28 shows an XR device, in accordance with an embodiment of the present disclosure. The XR device may be implemented by an HMD, an HUD mounted in a vehicle, a television, a smartphone, a computer, a wearable device, a home appliance, a digital signage, a vehicle, a robot, etc.

Referring to FIG. 28, an XR device (100a) may include a communication unit (110), a control unit (120), a memory unit (130), an I/O unit (140a), a sensor unit (140b), and a power supply unit (140c). Herein, the blocks 110~130/140a~140c correspond to the blocks 110~130/140 of FIG. 24, respectively.

The communication unit (110) may transmit and receive signals (e.g., media data and control signals) to and from external devices such as other wireless devices, hand-held devices, or media servers. The media data may include video, images, and sound. The control unit (120) may perform various operations by controlling constituent elements of the XR device (100a). For example, the control unit (120) may be configured to control and/or perform procedures such as video/image acquisition, (video/image) encoding, and metadata generation and processing. The memory unit (130) may store data/parameters/programs/code/commands needed to drive the XR device (100a)/generate XR object. The I/O unit (140a) may obtain control information and data from the exterior and output the generated XR object. The I/O unit (140a) may include a camera, a microphone, a user input unit, a display unit, a speaker, and/or a haptic module. The sensor unit (140b) may obtain an XR device state, surrounding environment information, user information, etc. The sensor unit (140b) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit (140c) may supply power to the XR device (100a) and include a wired/wireless charging circuit, a battery, etc.

For example, the memory unit (130) of the XR device (100a) may include information (e.g., data) needed to generate the XR object (e.g., an AR/VR/MR object). The I/O unit (140a) may receive a command for manipulating the XR device (100a) from a user and the control unit (120) may drive the XR device (100a) according to a driving command of a user. For example, when a user desires to watch a film or news through the XR device (100a), the control unit (120) transmits content request information to another device (e.g., a hand-held device (100b)) or a media server through the communication unit (130). The communication unit (130) may download/stream content such as films or news from another device (e.g., the hand-held device (100b)) or the media server to the memory unit (130). The control unit (120) may control and/or perform procedures such as video/image acquisition, (video/image) encoding, and metadata generation/processing with respect to the content and generate/output the XR object based on information about a surrounding space or a real object obtained through the I/O unit (140a)/sensor unit (140b).

The XR device (100a) may be wirelessly connected to the hand-held device (100b) through the communication unit (110) and the operation of the XR device (100a) may be controlled by the hand-held device (100b). For example, the hand-held device (100b) may operate as a controller of the XR device (100a). To this end, the XR device (100a) may obtain information about a 3D position of the hand-held device (100b) and generate and output an XR object corresponding to the hand-held device (100b).

Figure 29:
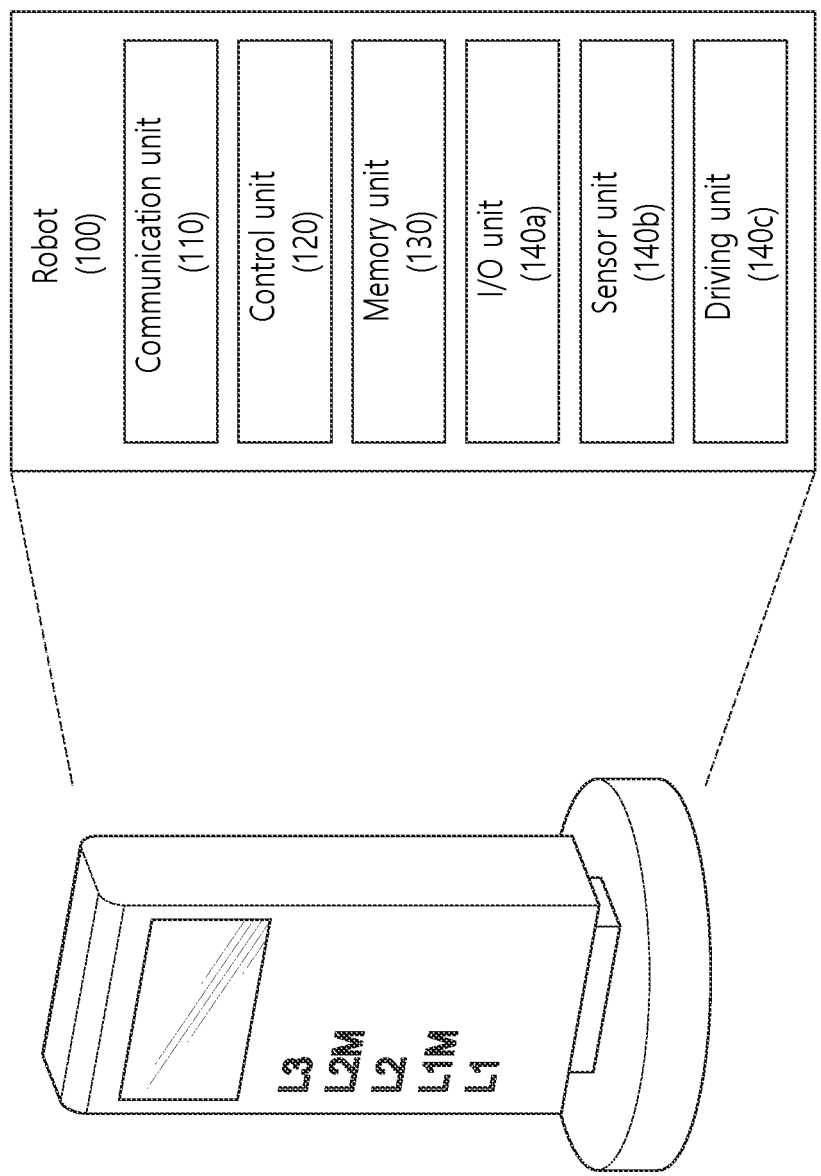
FIG. 29 shows a robot, in accordance with an embodiment of the present disclosure.

FIG. 29 shows a robot, in accordance with an embodiment of the present disclosure. The robot may be categorized into an industrial robot, a medical robot, a household robot, a military robot, etc., according to a used purpose or field.

Referring to FIG. 29, a robot (100) may include a communication unit (110), a control unit (120), a memory unit (130), an I/O unit (140a), a sensor unit (140b), and a driving unit (140c). Herein, the blocks 110~130/140a~140c correspond to the blocks 110~130/140 of FIG. 24, respectively.

The communication unit (110) may transmit and receive signals (e.g., driving information and control signals) to and from external devices such as other wireless devices, other robots, or control servers. The control unit (120) may perform various operations by controlling constituent elements of the robot (100). The memory unit (130) may store data/parameters/programs/code/commands for supporting various functions of the robot (100). The I/O unit (140*a*) may obtain information from the exterior of the robot (100) and output information to the exterior of the robot (100). The I/O unit (140*a*) may include a camera, a microphone, a user input unit, a display unit, a speaker, and/or a haptic module. The sensor unit (140*b*) may obtain internal information of the robot (100), surrounding environment information, user information, etc. The sensor unit (140*b*) may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit (140*c*) may perform various physical operations such as movement of robot joints. In addition, the driving unit (140*c*) may cause the robot (100) to travel on the road or to fly. The driving unit (140*c*) may include an actuator, a motor, a wheel, a brake, a propeller, etc.

Figure 30:
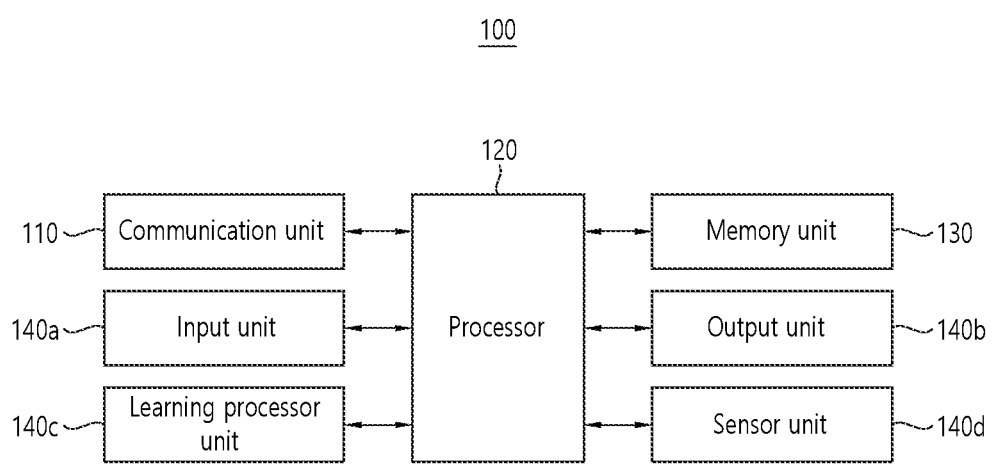
FIG. 30 shows an AI device, in accordance with an embodiment of the present disclosure.

FIG. 30 shows an AI device, in accordance with an embodiment of the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 30, an AI device (100) may include a communication unit (110), a control unit (120), a memory unit (130), an I/O unit (140*a*/140*b*), a learning processor unit (140*c*), and a sensor unit (140*d*). The blocks 110~130/140*a*~140*d* correspond to blocks 110~130/140 of FIG. 24, respectively.

The communication unit (110) may transmit and receive wired/radio signals (e.g., sensor information, user input, learning models, or control signals) to and from external devices such as other AI devices (e.g., 100*x*, 200, or 400 of FIG. 21) or an AI server (e.g., 400 of FIG. 21) using wired/wireless communication technology. To this end, the communication unit (110) may transmit information within the memory unit (130) to an external device and transmit a signal received from the external device to the memory unit (130).

The control unit (120) may determine at least one feasible operation of the AI device (100), based on information which is determined or generated using a data analysis algorithm or a machine learning algorithm. The control unit (120) may perform an operation determined by controlling constituent elements of the AI device (100). For example, the control unit (120) may request, search, receive, or use data of the learning processor unit (140*c*) or the memory unit (130) and control the constituent elements of the AI device (100) to perform a predicted operation or an operation determined to be preferred among at least one feasible operation. The control unit (120) may collect history information including the operation contents of the AI device (100) and operation feedback by a user and store the collected information in the memory unit (130) or the learning processor unit (140*c*) or transmit the collected information to an external device such as an AI server (400 of FIG. 21). The collected history information may be used to update a learning model.

The memory unit (130) may store data for supporting various functions of the AI device (100). For example, the memory unit (130) may store data obtained from the input unit (140*a*), data obtained from the communication unit (110), output data of the learning processor unit (140*c*), and data obtained from the sensor unit (140). The memory unit (130) may store control information and/or software code needed to operate/drive the control unit (120).

The input unit (140*a*) may acquire various types of data from the exterior of the AI device (100). For example, the input unit (140*a*) may acquire learning data for model learning, and input data to which the learning model is to be applied. The input unit (140*a*) may include a camera, a microphone, and/or a user input unit. The output unit (140*b*) may generate output related to a visual, auditory, or tactile sense. The output unit (140*b*) may include a display unit, a speaker, and/or a haptic module. The sensing unit (140) may obtain at least one of internal information of the AI device (100), surrounding environment information of the AI device (100), and user information, using various sensors. The sensor unit (140) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit (140*c*) may learn a model consisting of artificial neural networks, using learning data. The learning processor unit (140*c*) may perform AI processing together with the learning processor unit of the AI server (400 of FIG. 21). The learning processor unit (140*c*) may process information received from an external device through the communication unit (110) and/or information stored in the memory unit (130). In addition, an output value of the learning processor unit (140*c*) may be transmitted to the external device through the communication unit (110) and may be stored in the memory unit (130).

Claims in the present description can be combined in various ways. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing, by a first device, sidelink (SL) transmission, the method comprising:
   receiving, from a second device, assistance information related to one or more resources for SL communication;
   selecting a transmission resource from among the one or more resources based on the assistance information; and
   performing the SL transmission on the transmission resource,
   wherein the assistance information includes information regarding one or more resources with high reference signal received power (RSRP) determined by the second device, and
   wherein the transmission resource is selected from among resources other than the one or more resources with high RSRP.

2. The method of claim 1, wherein the assistance information includes channel state information for the one or more resources measured by the second device.

3. The method of claim 2, further comprising:
   measuring a channel state for the one or more resources.

4. The method of claim 3, further comprising:
   adjusting channel state information for the one or more resources measured by the first device based on the assistance information.

5. The method of claim 4, wherein the transmission resource is selected based on the adjusted channel state information for the one or more resources.

6. The method of claim 1, wherein the assistance information includes information regarding one or more resources, determined by the second device, to be used by the second device or other devices.

7. The method of claim 1, wherein the assistance information includes information regarding one or more resources related to a specific service.

8. The method of claim 7, wherein the specific service includes at least one of a service related to a high priority, a service related to a high reliability, or a service related to a low delay.

9. The method of claim 8, wherein the transmission resource is selected from among resources other than the one or more resources related to the specific service.

10. A first device configured for performing sidelink (SL) transmission, the first device comprising:
   one or more memories storing instructions;
   one or more transceivers; and
   one or more processors operably connected to the one or more memories and the one or more transceivers, wherein the one or more processors are configured to execute the instructions to perform operations comprising:
   receiving, from a second device, assistance information related to one or more resources for SL communication;
   selecting a transmission resource from among the one or more resources based on the assistance information; and
   performing the SL transmission on the transmission resource,
   wherein the assistance information includes information regarding one or more resources with high reference signal received power (RSRP) determined by the second device, and
   wherein the transmission resource is selected from among resources other than the one or more resources with high RSRP.

* * * * *